US012656629B2

(12) United States Patent
De Juan, Jr.

(10) Patent No.: US 12,656,629 B2
(45) Date of Patent: Jun. 16, 2026

(54) ASTIGMATISM CORRECTING CONTACT LENSES

(71) Applicant: Journey1, Inc., South San Francisco, CA (US)

(72) Inventor: Eugene De Juan, Jr., San Francisco, CA (US)

(73) Assignee: Journey 1 Inc, South San Francisco, CA (US)

( * ) Notice: Subject to any disclaimer, the term of this patent is extended or adjusted under 35 U.S.C. 154(b) by 348 days.

(21) Appl. No.: 18/301,859

(22) Filed: Apr. 17, 2023

(65) Prior Publication Data

US 2024/0345418 A1      Oct. 17, 2024

Related U.S. Application Data

(63) Continuation of application No. PCT/US2021/054533, filed on Oct. 12, 2021.

(60) Provisional application No. 63/093,517, filed on Oct. 19, 2020.

(51) Int. Cl.
*G02B 27/00* (2006.01)
*G02C 7/04* (2006.01)

(52) U.S. Cl.
CPC .................................. *G02C 7/041* (2013.01)

(58) Field of Classification Search
CPC ........ G02C 7/041; G02C 7/049; G02C 7/047; G02B 27/0025
See application file for complete search history.

(56) References Cited

U.S. PATENT DOCUMENTS

| | | | |
|---|---|---|---|
| 2,641,161 A | 6/1953 | Silverstein | |
| 2,714,721 A | 8/1955 | Stone, Jr. et al. | |
| 2,952,023 A | 9/1960 | Hyman et al. | |
| (Continued) | | | |

FOREIGN PATENT DOCUMENTS

| | | |
|---|---|---|
| CA | 993401 A | 7/1976 |
| CA | 2174967 A1 | 5/1995 |
| (Continued) | | |

OTHER PUBLICATIONS

Alio et al. Contact Lens Fitting to Correct Irregular Astigmatic After Corneal Refractive Surgery. Journal of Cataract & Refractive Surgery 28(10):1750-1757 (2002).

(Continued)

*Primary Examiner* — Mustak Choudhury
(74) *Attorney, Agent, or Firm* — Mark S. Cohen; PEARL COHEN ZEDEK LATZER BARATZ LLP

(57) ABSTRACT

The present disclosure provides coverings such as contact lenses which can be used to provide improved vision in an eye of a subject, such as a human or animal subject. The coverings may comprise a pillar and a plurality of fenestrations. In some cases, an annular region such as a lenticular volume may be formed on the eye of the subject which may provide enhance comfort while the covering is in use. The coverings provided herein may have uses and applications such as masking an astigmatism of an eye, correcting a refractive error of an eye, the treatment of an eye having epithelial defects, aberration correction, multifocal correction, presbyopia correction, and other applications. Some embodiments of the present disclosure comprise extended wear contact lenses.

20 Claims, 6 Drawing Sheets

(56)                References Cited

U.S. PATENT DOCUMENTS

| | | |
|---|---|---|
| 3,246,941 A | 4/1966 | Moss |
| 3,431,046 A | 3/1969 | Conrad et al. |
| 3,468,602 A | 9/1969 | Rosen et al. |
| 3,488,111 A | 1/1970 | Isen et al. |
| 3,489,491 A | 1/1970 | Creighton et al. |
| 3,495,899 A | 2/1970 | Biri et al. |
| 3,594,074 A | 7/1971 | Rosen et al. |
| 3,619,044 A | 11/1971 | Kamath et al. |
| 3,688,386 A | 9/1972 | Pereira et al. |
| 3,833,786 A | 9/1974 | Brucker et al. |
| 3,915,609 A | 10/1975 | Robinson |
| 3,944,347 A | 3/1976 | Barkdoll et al. |
| 3,973,837 A | 8/1976 | Page |
| 3,973,838 A | 8/1976 | Page |
| 4,037,866 A | 7/1977 | Price |
| 4,053,442 A | 10/1977 | Jungr et al. |
| 4,068,933 A | 1/1978 | Seiderman |
| 4,071,272 A | 1/1978 | Drdlik |
| 4,121,885 A | 10/1978 | Erickson et al. |
| 4,126,904 A | 11/1978 | Shepard |
| 4,166,255 A | 8/1979 | Graham et al. |
| 4,171,878 A | 10/1979 | Arbuzova et al. |
| 4,194,815 A | 3/1980 | Trombley et al. |
| 4,198,132 A | 4/1980 | Jacobson et al. |
| 4,200,320 A | 4/1980 | Durham et al. |
| 4,208,362 A | 6/1980 | Deichert et al. |
| 4,211,476 A | 7/1980 | Brummel et al. |
| 4,268,131 A | 5/1981 | Miyata et al. |
| 4,268,133 A | 5/1981 | Fischer et al. |
| 4,312,575 A | 1/1982 | Peyman et al. |
| 4,346,482 A | 8/1982 | Tennant et al. |
| 4,381,007 A | 4/1983 | Doss |
| 4,407,766 A | 10/1983 | Haardt et al. |
| 4,452,776 A | 6/1984 | Refojo et al. |
| 4,452,925 A | 6/1984 | Kuzma et al. |
| 4,487,905 A | 12/1984 | Mitchell et al. |
| 4,563,779 A | 1/1986 | Kelman et al. |
| 4,581,030 A | 4/1986 | Bruns et al. |
| 4,593,981 A | 6/1986 | Scilipoti et al. |
| 4,621,912 A | 11/1986 | Meyer et al. |
| 4,624,669 A | 11/1986 | Grendahl et al. |
| 4,640,594 A * | 2/1987 | Berger .................... G02C 7/04 |
| | | 351/159.04 |
| 4,666,249 A | 5/1987 | Bauman et al. |
| 4,666,267 A | 5/1987 | Wichterle et al. |
| 4,676,790 A | 6/1987 | Kern et al. |
| 4,693,715 A | 9/1987 | Abel, Jr. et al. |
| 4,701,288 A | 10/1987 | Cook et al. |
| 4,715,858 A | 12/1987 | Lindstrom et al. |
| 4,772,283 A | 9/1988 | White et al. |
| 4,799,931 A | 1/1989 | Lindstrom et al. |
| 4,806,382 A | 2/1989 | Goldberg et al. |
| 4,810,082 A | 3/1989 | Abel, Jr. et al. |
| 4,834,748 A | 5/1989 | McDonald et al. |
| 4,851,003 A | 7/1989 | Lindstrom et al. |
| 4,866,350 A | 9/1989 | Counts et al. |
| 4,886,350 A | 12/1989 | Wichterle et al. |
| 4,890,911 A | 1/1990 | Sulc et al. |
| 4,909,896 A | 3/1990 | Ikushima et al. |
| 4,923,467 A | 5/1990 | Thompson et al. |
| 4,940,751 A | 7/1990 | Frances et al. |
| 4,943,150 A | 7/1990 | Deichert et al. |
| 4,952,045 A | 8/1990 | Stoyan et al. |
| 4,969,912 A | 11/1990 | Kelman et al. |
| 4,973,493 A | 11/1990 | Guire |
| 4,978,481 A | 12/1990 | Janssen et al. |
| 4,979,959 A | 12/1990 | Guire et al. |
| 4,981,841 A | 1/1991 | Gibson et al. |
| 4,983,181 A | 1/1991 | Civerchia et al. |
| 4,994,081 A | 2/1991 | Civerchia et al. |
| 4,997,583 A | 3/1991 | Itzhak et al. |
| 5,008,289 A | 4/1991 | Bernstein et al. |
| 5,019,097 A | 5/1991 | Knight et al. |
| 5,030,230 A | 7/1991 | White et al. |
| 5,044,742 A | 9/1991 | Cohen |
| 5,073,021 A | 12/1991 | Marron et al. |
| 5,104,213 A | 4/1992 | Wolfson et al. |
| 5,108,428 A | 4/1992 | Capecchi et al. |
| 5,112,350 A | 5/1992 | Civerchia et al. |
| 5,114,627 A | 5/1992 | Civerchia et al. |
| 5,143,660 A | 9/1992 | Hamilton et al. |
| 5,152,786 A | 10/1992 | Hanna et al. |
| 5,156,622 A | 10/1992 | Thompson et al. |
| 5,159,360 A | 10/1992 | Stoy et al. |
| 5,163,596 A | 11/1992 | Ravoo et al. |
| 5,163,934 A | 11/1992 | Munnerlyn et al. |
| 5,166,710 A | 11/1992 | Hoefer et al. |
| 5,171,318 A | 12/1992 | Gibson et al. |
| 5,178,879 A | 1/1993 | Adekunle et al. |
| 5,191,365 A | 3/1993 | Stoyan et al. |
| 5,192,316 A | 3/1993 | Ting et al. |
| 5,196,027 A | 3/1993 | Thompson et al. |
| 5,213,720 A | 5/1993 | Civerchia et al. |
| 5,236,236 A | 8/1993 | Girimont et al. |
| 5,244,799 A | 9/1993 | Anderson et al. |
| 5,245,367 A | 9/1993 | Miller et al. |
| 5,246,259 A | 9/1993 | Hellenkamp et al. |
| 5,263,992 A | 11/1993 | Guire et al. |
| 5,292,514 A | 3/1994 | Capecchi et al. |
| 5,293,186 A | 3/1994 | Seden et al. |
| 5,312,320 A | 5/1994 | L'Esperance, Jr. |
| 5,346,491 A | 9/1994 | Oertli et al. |
| 5,347,326 A | 9/1994 | Volk et al. |
| 5,349,395 A | 9/1994 | Stoyan et al. |
| 5,397,848 A | 3/1995 | Yang et al. |
| 5,401,508 A | 3/1995 | Manesis et al. |
| 5,428,412 A | 6/1995 | Stoyan et al. |
| 5,433,714 A | 7/1995 | Bloomberg et al. |
| 5,433,898 A | 7/1995 | Thakrar et al. |
| 5,434,630 A | 7/1995 | Bransome et al. |
| 5,472,436 A | 12/1995 | Fremstad et al. |
| 5,489,300 A | 2/1996 | Capecchi et al. |
| 5,496,084 A | 3/1996 | Miralles et al. |
| 5,517,260 A | 5/1996 | Glady et al. |
| 5,522,888 A | 6/1996 | Civerchia et al. |
| 5,538,301 A | 7/1996 | Yavitz et al. |
| 5,552,452 A | 9/1996 | Khadem et al. |
| 5,570,144 A | 10/1996 | Lofgren-Nisser et al. |
| 5,578,332 A | 11/1996 | Hamilton et al. |
| 5,598,233 A | 1/1997 | Haralambopoulos et al. |
| 5,612,432 A | 3/1997 | Taniguchi et al. |
| 5,628,794 A | 5/1997 | Lindstrom et al. |
| 5,632,733 A | 5/1997 | Shaw et al. |
| 5,632,773 A | 5/1997 | Graham et al. |
| 5,649,922 A | 7/1997 | Yavitz et al. |
| 5,662,706 A | 9/1997 | Legerton et al. |
| 5,671,038 A | 9/1997 | Porat et al. |
| 5,712,721 A | 1/1998 | Large |
| 5,713,957 A | 2/1998 | Steele et al. |
| 5,716,633 A | 2/1998 | Civerchia et al. |
| 5,723,541 A | 3/1998 | Ingenito et al. |
| 5,732,990 A | 3/1998 | Yavitz et al. |
| 5,757,458 A | 5/1998 | Miller et al. |
| 5,760,100 A | 6/1998 | Nicolson et al. |
| 5,760,870 A | 6/1998 | Payor et al. |
| 5,804,263 A | 9/1998 | Goldberg et al. |
| 5,814,329 A | 9/1998 | Shah et al. |
| 5,820,624 A | 10/1998 | Yavitz et al. |
| 5,836,313 A | 11/1998 | Perez et al. |
| 5,854,291 A | 12/1998 | Laughlin et al. |
| 5,869,533 A | 2/1999 | Holt et al. |
| 5,885,597 A | 3/1999 | Botknecht et al. |
| 5,905,561 A | 5/1999 | Lee et al. |
| 5,910,512 A | 6/1999 | Conant et al. |
| 5,923,397 A | 7/1999 | Bonafini, Jr. et al. |
| 5,929,968 A | 7/1999 | Cotie et al. |
| 5,932,205 A | 8/1999 | Wang et al. |
| 5,942,243 A | 8/1999 | Shah et al. |
| 5,953,098 A | 9/1999 | Lieberman et al. |
| 5,957,921 A | 9/1999 | Mirhashemi et al. |
| 5,962,532 A | 10/1999 | Campbell et al. |
| 5,971,541 A | 10/1999 | Danker et al. |
| 5,980,040 A | 11/1999 | Xu et al. |
| 5,986,001 A | 11/1999 | Ingenito et al. |

(56) References Cited

U.S. PATENT DOCUMENTS

| | | | |
|---|---|---|---|
| 6,010,219 A | 1/2000 | Stoyan | |
| 6,030,974 A | 2/2000 | Schwartz et al. | |
| 6,036,314 A | 3/2000 | Wolfson et al. | |
| 6,036,688 A | 3/2000 | Edwards et al. | |
| 6,048,855 A | 4/2000 | De Lacharriere et al. | |
| 6,055,990 A | 5/2000 | Thompson et al. | |
| 6,075,066 A | 6/2000 | Matsuda et al. | |
| 6,090,995 A | 7/2000 | Reich et al. | |
| 6,092,898 A | 7/2000 | De Juan, Jr. et al. | |
| 6,099,121 A | 8/2000 | Chapman et al. | |
| 6,143,315 A | 11/2000 | Wang et al. | |
| 6,217,171 B1 | 4/2001 | Auten et al. | |
| 6,244,709 B1 | 6/2001 | Vayntraub et al. | |
| 6,248,788 B1 | 6/2001 | Robbins et al. | |
| 6,325,509 B1 | 12/2001 | Hodur et al. | |
| 6,340,229 B1 | 1/2002 | Lieberman et al. | |
| 6,361,169 B1 | 3/2002 | Tung et al. | |
| 6,364,482 B1 | 4/2002 | Roffman et al. | |
| 6,406,145 B1 | 6/2002 | Jubin et al. | |
| 6,454,800 B2 | 9/2002 | Dalton et al. | |
| 6,474,814 B1 | 11/2002 | Griffin et al. | |
| 6,520,637 B2 | 2/2003 | Hodur et al. | |
| 6,541,028 B1 | 4/2003 | Kuri-Harcuch et al. | |
| 6,544,286 B1 | 4/2003 | Perez et al. | |
| 6,551,307 B2 | 4/2003 | Peyman et al. | |
| 6,568,808 B2 | 5/2003 | Campin et al. | |
| 6,579,918 B1 | 6/2003 | Auten et al. | |
| 6,593,370 B2 | 7/2003 | Tamura et al. | |
| 6,607,522 B1 | 8/2003 | Hamblin et al. | |
| 6,645,715 B1 | 11/2003 | Griffith et al. | |
| 6,652,095 B2 | 11/2003 | Tung et al. | |
| 6,659,607 B2 | 12/2003 | Miyamura et al. | |
| 6,689,165 B2 | 2/2004 | Jacob et al. | |
| 6,702,807 B2 | 3/2004 | Peyman et al. | |
| 6,726,322 B2 | 4/2004 | Andino et al. | |
| 6,726,684 B1 | 4/2004 | Woloszko et al. | |
| 6,779,888 B2 | 8/2004 | Marmo et al. | |
| 6,843,563 B2 | 1/2005 | Richardson et al. | |
| 6,849,671 B2 | 2/2005 | Steffen et al. | |
| 6,880,558 B2 | 4/2005 | Perez et al. | |
| 6,918,904 B1 | 7/2005 | Peyman et al. | |
| 6,951,894 B1 | 10/2005 | Nicolson et al. | |
| 6,958,148 B1 | 10/2005 | Green et al. | |
| 6,958,158 B2 | 10/2005 | Tenhuisen et al. | |
| 7,004,953 B2 | 2/2006 | Pallikaris et al. | |
| 7,018,039 B2 | 3/2006 | Legerton et al. | |
| 7,025,455 B2 | 4/2006 | Roffman et al. | |
| 7,040,757 B2 | 5/2006 | Hall et al. | |
| 7,077,839 B2 | 7/2006 | Hamblin et al. | |
| 7,080,905 B2 | 7/2006 | Marmo et al. | |
| 7,097,301 B2 | 8/2006 | Legerton et al. | |
| 7,104,648 B2 | 9/2006 | Dahi et al. | |
| 7,150,529 B2 | 12/2006 | Legerton et al. | |
| 7,163,292 B2 | 1/2007 | Dahi et al. | |
| 7,193,124 B2 | 3/2007 | Coffee et al. | |
| 7,216,974 B2 | 5/2007 | Meyers et al. | |
| 7,229,685 B2 | 6/2007 | Full et al. | |
| 7,249,849 B2 | 7/2007 | Marmo et al. | |
| 7,270,412 B2 | 9/2007 | Legerton et al. | |
| 7,322,694 B2 | 1/2008 | Dahi et al. | |
| 7,329,001 B2 | 2/2008 | Benrashid et al. | |
| 7,338,160 B2 | 3/2008 | Lieberman et al. | |
| 7,360,890 B2 | 4/2008 | Back et al. | |
| 7,377,637 B2 | 5/2008 | Legerton et al. | |
| 7,401,922 B2 | 7/2008 | Legerton et al. | |
| 7,401,992 B1 | 7/2008 | Lin et al. | |
| 7,404,638 B2 | 7/2008 | Miller et al. | |
| 7,461,937 B2 | 12/2008 | Steffen et al. | |
| 7,491,350 B2 | 2/2009 | Silvestrini et al. | |
| 7,530,689 B2 | 5/2009 | Berke et al. | |
| 7,537,339 B2 | 5/2009 | Legerton et al. | |
| 7,543,936 B2 | 6/2009 | Legerton et al. | |
| 7,559,649 B2 | 7/2009 | Cotie et al. | |
| 7,585,074 B2 | 9/2009 | Dahi et al. | |
| 7,594,725 B2 | 9/2009 | Legerton et al. | |
| 7,628,810 B2 | 12/2009 | Christie et al. | |
| 7,682,020 B2 | 3/2010 | Berke et al. | |
| 7,695,135 B1 | 4/2010 | Rosenthal | |
| 7,699,465 B2 | 4/2010 | Dootjes et al. | |
| 7,717,555 B2 | 5/2010 | Legerton et al. | |
| 7,735,997 B2 | 6/2010 | Muckenhirn et al. | |
| 7,748,844 B2 | 7/2010 | Lai et al. | |
| 7,762,668 B2 | 7/2010 | Dai et al. | |
| 7,828,432 B2 | 11/2010 | Meyers et al. | |
| 7,859,769 B2 | 12/2010 | Zalevsky et al. | |
| 7,976,577 B2 | 7/2011 | Silvestrini et al. | |
| 7,984,988 B2 | 7/2011 | Berke et al. | |
| 8,137,344 B2 | 3/2012 | Jia et al. | |
| 8,201,941 B2 | 6/2012 | Choo et al. | |
| 8,459,793 B2 | 6/2013 | De Juan, Jr. et al. | |
| 8,485,662 B2 | 7/2013 | Collins et al. | |
| 8,591,025 B1 | 11/2013 | De Juan, Jr. et al. | |
| 8,678,584 B2 | 3/2014 | De Juan, Jr. et al. | |
| 8,864,306 B2 | 10/2014 | De Juan, Jr. et al. | |
| 8,882,757 B2 | 11/2014 | Muller et al. | |
| 8,926,096 B2 | 1/2015 | De Juan, Jr. et al. | |
| 9,046,699 B2 | 6/2015 | Caldarise et al. | |
| 9,107,773 B2 | 8/2015 | De Juan, Jr. et al. | |
| 9,125,735 B2 | 9/2015 | De Juan, Jr. et al. | |
| 9,241,837 B2 | 1/2016 | De Juan, Jr. et al. | |
| 9,341,864 B2 | 5/2016 | De Juan, Jr. et al. | |
| 9,395,558 B2 | 7/2016 | De Juan, Jr. et al. | |
| 9,423,632 B2 | 8/2016 | De Juan, Jr. et al. | |
| 9,465,233 B2 | 10/2016 | De Juan, Jr. et al. | |
| 9,498,385 B2 | 11/2016 | De Juan, Jr. et al. | |
| 9,526,656 B2 | 12/2016 | Serdarevic et al. | |
| 9,740,025 B2 | 8/2017 | De Juan, Jr. et al. | |
| 9,740,026 B2 | 8/2017 | De Juan, Jr. et al. | |
| 9,810,921 B2 | 11/2017 | De Juan, Jr. et al. | |
| 9,851,586 B2 | 12/2017 | De Juan, Jr. et al. | |
| 9,943,401 B2 | 4/2018 | De Juan, Jr. et al. | |
| 10,036,900 B2 | 7/2018 | De Juan, Jr. et al. | |
| 10,039,671 B2 | 8/2018 | De Juan, Jr. et al. | |
| 10,191,303 B2 | 1/2019 | De Juan, Jr. et al. | |
| 10,555,804 B2 * | 2/2020 | De Juan, Jr. | A61F 2/142 |
| 10,596,038 B2 | 3/2020 | Alster et al. | |
| 10,627,649 B2 | 4/2020 | De Juan, Jr. et al. | |
| 10,663,761 B2 | 5/2020 | De Juan, Jr. et al. | |
| 11,126,011 B2 | 9/2021 | De Juan, Jr. et al. | |
| 2001/0047203 A1 | 11/2001 | Dalton et al. | |
| 2002/0075447 A1 | 6/2002 | Andino et al. | |
| 2002/0095199 A1 | 7/2002 | West et al. | |
| 2002/0107567 A1 | 8/2002 | Terwee et al. | |
| 2002/0151972 A1 | 10/2002 | Hughes et al. | |
| 2002/0164484 A1 | 11/2002 | Jiang et al. | |
| 2003/0144650 A1 | 7/2003 | Smith | |
| 2003/0187515 A1 | 10/2003 | Hariri et al. | |
| 2004/0015163 A1 | 1/2004 | Buysse et al. | |
| 2004/0037866 A1 | 2/2004 | Semertzides et al. | |
| 2004/0048796 A1 | 3/2004 | Hariri et al. | |
| 2004/0053442 A1 | 3/2004 | Akram et al. | |
| 2004/0068933 A1 | 4/2004 | Nakamura et al. | |
| 2004/0071272 A1 | 4/2004 | Mizuguchi et al. | |
| 2004/0088050 A1 | 5/2004 | Norrby et al. | |
| 2004/0121885 A1 | 6/2004 | Garcia-Rill et al. | |
| 2004/0141150 A1 | 7/2004 | Roffman et al. | |
| 2004/0143026 A1 | 7/2004 | Shah et al. | |
| 2004/0166255 A1 | 8/2004 | Pierce et al. | |
| 2004/0170666 A1 | 9/2004 | Keates et al. | |
| 2004/0171878 A1 | 9/2004 | Kok et al. | |
| 2004/0184158 A1 | 9/2004 | Shadduck et al. | |
| 2004/0194815 A1 | 10/2004 | Deiss et al. | |
| 2004/0200320 A1 | 10/2004 | Knopp et al. | |
| 2004/0208362 A1 | 10/2004 | Suzuki et al. | |
| 2004/0211476 A1 | 10/2004 | Hager et al. | |
| 2004/0212779 A1 | 10/2004 | Dahi et al. | |
| 2005/0018130 A1 | 1/2005 | Dahi et al. | |
| 2005/0028723 A1 | 2/2005 | Ancel et al. | |
| 2005/0033420 A1 | 2/2005 | Christie et al. | |
| 2005/0107775 A1 | 5/2005 | Huang et al. | |
| 2005/0191365 A1 | 9/2005 | Creasey et al. | |
| 2005/0213030 A1 | 9/2005 | Meyers et al. | |
| 2005/0236236 A1 | 10/2005 | Farooq et al. | |
| 2005/0238692 A1 | 10/2005 | Hughes et al. | |

(56) References Cited

U.S. PATENT DOCUMENTS

| | | | |
|---|---|---|---|
| 2005/0245367 A1 | 11/2005 | Horvath et al. | |
| 2005/0246259 A1 | 11/2005 | Lavoie et al. | |
| 2005/0259221 A1 | 11/2005 | Marmo et al. | |
| 2005/0270491 A1 | 12/2005 | Dai et al. | |
| 2005/0288196 A1 | 12/2005 | Horn et al. | |
| 2006/0010219 A1 | 1/2006 | Saito et al. | |
| 2006/0013050 A1 | 1/2006 | Fukuzumi et al. | |
| 2006/0030974 A1 | 2/2006 | Tsukasaki et al. | |
| 2006/0034807 A1 | 2/2006 | Griffith et al. | |
| 2006/0036314 A1 | 2/2006 | Perez, I et al. | |
| 2006/0048855 A1 | 3/2006 | Honkura et al. | |
| 2006/0075066 A1 | 4/2006 | Farchmin et al. | |
| 2006/0077581 A1 | 4/2006 | Schwiegerling et al. | |
| 2006/0083773 A1 | 4/2006 | Myung et al. | |
| 2006/0099121 A1 | 5/2006 | Doona et al. | |
| 2006/0100617 A1 | 5/2006 | Boukhny et al. | |
| 2006/0132707 A1* | 6/2006 | Tung .................... A61F 9/0017 351/159.23 | |
| 2006/0134170 A1 | 6/2006 | Griffith et al. | |
| 2006/0152673 A1 | 7/2006 | Cotie et al. | |
| 2006/0197909 A1 | 9/2006 | Legerton et al. | |
| 2006/0197910 A1 | 9/2006 | Legerton et al. | |
| 2006/0217171 A1 | 9/2006 | Roireau et al. | |
| 2006/0235514 A1 | 10/2006 | Silvestrini et al. | |
| 2006/0238712 A1 | 10/2006 | Dahi et al. | |
| 2006/0241751 A1 | 10/2006 | Marmo et al. | |
| 2006/0244709 A1 | 11/2006 | Lin et al. | |
| 2006/0246113 A1 | 11/2006 | Griffith et al. | |
| 2006/0248788 A1 | 11/2006 | Harris et al. | |
| 2006/0250576 A1 | 11/2006 | Legerton et al. | |
| 2006/0256283 A1 | 11/2006 | Legerton et al. | |
| 2006/0256284 A1 | 11/2006 | Dahi et al. | |
| 2006/0285071 A1 | 12/2006 | Erickson et al. | |
| 2006/0285072 A1 | 12/2006 | Dahi et al. | |
| 2006/0290882 A1 | 12/2006 | Meyers et al. | |
| 2007/0002046 A1 | 1/2007 | Tanacs et al. | |
| 2007/0013869 A1 | 1/2007 | Dahi et al. | |
| 2007/0014760 A1 | 1/2007 | Peyman et al. | |
| 2007/0018039 A1 | 1/2007 | Hillen et al. | |
| 2007/0025455 A1 | 2/2007 | Greenwood et al. | |
| 2007/0037898 A1 | 2/2007 | Phelan et al. | |
| 2007/0046894 A1 | 3/2007 | Muckenhirn et al. | |
| 2007/0055222 A1 | 3/2007 | Hohla et al. | |
| 2007/0080905 A1 | 4/2007 | Takahara et al. | |
| 2007/0097301 A1 | 5/2007 | Yang et al. | |
| 2007/0104648 A1 | 5/2007 | Shull et al. | |
| 2007/0106394 A1 | 5/2007 | Chen et al. | |
| 2007/0129720 A1 | 6/2007 | Demarais et al. | |
| 2007/0132948 A1 | 6/2007 | Evans et al. | |
| 2007/0135915 A1 | 6/2007 | Klima et al. | |
| 2007/0150529 A1 | 6/2007 | McCall et al. | |
| 2007/0163292 A1 | 7/2007 | Weng et al. | |
| 2007/0182920 A1 | 8/2007 | Back et al. | |
| 2007/0193124 A1 | 8/2007 | Thompson et al. | |
| 2007/0196454 A1 | 8/2007 | Stockman et al. | |
| 2007/0216974 A1 | 9/2007 | Silverbrook et al. | |
| 2007/0232755 A1 | 10/2007 | Matsushita et al. | |
| 2007/0242216 A1 | 10/2007 | Dootjes et al. | |
| 2007/0244559 A1 | 10/2007 | Shiuey et al. | |
| 2007/0249849 A1 | 10/2007 | Wiebe et al. | |
| 2007/0270412 A1 | 11/2007 | Bell et al. | |
| 2007/0273834 A1 | 11/2007 | Legerton et al. | |
| 2008/0002149 A1 | 1/2008 | Fritsch | |
| 2008/0039832 A1 | 2/2008 | Palanker et al. | |
| 2008/0074611 A1 | 3/2008 | Meyers et al. | |
| 2008/0100796 A1 | 5/2008 | Pruitt et al. | |
| 2008/0201941 A1 | 8/2008 | Montena et al. | |
| 2008/0243156 A1 | 10/2008 | John et al. | |
| 2008/0287915 A1 | 11/2008 | Rosenthal et al. | |
| 2008/0291391 A1 | 11/2008 | Meyers et al. | |
| 2009/0033864 A1 | 2/2009 | Shone et al. | |
| 2009/0096987 A1 | 4/2009 | Lai et al. | |
| 2009/0161826 A1 | 6/2009 | Gertner et al. | |
| 2009/0161827 A1 | 6/2009 | Gertner et al. | |
| 2009/0182312 A1 | 7/2009 | Gertner et al. | |

| | | | |
|---|---|---|---|
| 2009/0209954 A1 | 8/2009 | Muller et al. | |
| 2009/0216217 A1 | 8/2009 | Odrich et al. | |
| 2009/0237612 A1 | 9/2009 | Cotie et al. | |
| 2009/0244477 A1 | 10/2009 | Pugh et al. | |
| 2009/0303434 A1 | 12/2009 | Tung et al. | |
| 2009/0303442 A1 | 12/2009 | Choo et al. | |
| 2010/0036488 A1 | 2/2010 | De Juan, Jr. et al. | |
| 2010/0060849 A1 | 3/2010 | Hibino et al. | |
| 2010/0128224 A1 | 5/2010 | Legerton et al. | |
| 2010/0145447 A1 | 6/2010 | Jia et al. | |
| 2010/0157250 A1 | 6/2010 | Berke et al. | |
| 2010/0185192 A1 | 7/2010 | Muller et al. | |
| 2010/0191178 A1 | 7/2010 | Ross et al. | |
| 2010/0208196 A1 | 8/2010 | Benrashid et al. | |
| 2010/0271589 A1 | 10/2010 | Legerton et al. | |
| 2011/0034854 A1 | 2/2011 | Neuberger et al. | |
| 2011/0071631 A1 | 3/2011 | Rosenthal et al. | |
| 2011/0081000 A1 | 4/2011 | Gertner et al. | |
| 2011/0081001 A1 | 4/2011 | Gertner et al. | |
| 2011/0116035 A1 | 5/2011 | Fritsch | |
| 2011/0190742 A1 | 8/2011 | Anisimov | |
| 2011/0208300 A1 | 8/2011 | De Juan, Jr. et al. | |
| 2012/0105804 A1 | 5/2012 | Legerton et al. | |
| 2012/0113386 A1 | 5/2012 | Back et al. | |
| 2012/0169994 A1 | 7/2012 | Matsushita et al. | |
| 2012/0310133 A1 | 12/2012 | De Juan, Jr. et al. | |
| 2012/0327362 A1 | 12/2012 | Doraiswamy et al. | |
| 2013/0025606 A1 | 1/2013 | De Juan, Jr. et al. | |
| 2013/0066283 A1 | 3/2013 | Alster et al. | |
| 2013/0070200 A1 | 3/2013 | De Juan, Jr. et al. | |
| 2013/0077044 A1 | 3/2013 | De Juan, Jr. et al. | |
| 2013/0201442 A1 | 8/2013 | Back et al. | |
| 2013/0201443 A1 | 8/2013 | Back et al. | |
| 2013/0201454 A1 | 8/2013 | Back et al. | |
| 2013/0208236 A1 | 8/2013 | Mccabe et al. | |
| 2013/0208237 A1 | 8/2013 | Hawke et al. | |
| 2013/0222761 A1 | 8/2013 | Hansen et al. | |
| 2013/0242255 A1 | 9/2013 | Caldarise et al. | |
| 2013/0258276 A1 | 10/2013 | Hansen et al. | |
| 2013/0278890 A1 | 10/2013 | De Juan, Jr. et al. | |
| 2013/0293832 A1 | 11/2013 | De Juan, Jr. et al. | |
| 2014/0028979 A1 | 1/2014 | De Juan, Jr. et al. | |
| 2014/0043588 A1 | 2/2014 | Grant et al. | |
| 2014/0069438 A1 | 3/2014 | De Juan, Jr. et al. | |
| 2014/0069439 A1 | 3/2014 | De Juan, Jr. et al. | |
| 2014/0155800 A1 | 6/2014 | De Juan, Jr. et al. | |
| 2014/0251347 A1 | 9/2014 | De Juan, Jr. et al. | |
| 2014/0362338 A1 | 12/2014 | De Juan, Jr. et al. | |
| 2015/0055081 A1 | 2/2015 | De Juan, Jr. et al. | |
| 2015/0077701 A1 | 3/2015 | De Juan, Jr. et al. | |
| 2016/0018671 A1 | 1/2016 | Waite et al. | |
| 2016/0067109 A1 | 3/2016 | De Juan, Jr. et al. | |
| 2016/0170233 A1 | 6/2016 | De, Jr. et al. | |
| 2016/0180233 A1 | 6/2016 | Britt et al. | |
| 2016/0223835 A1 | 8/2016 | De Juan, Jr. et al. | |
| 2016/0299356 A1 | 10/2016 | Mitsui | |
| 2016/0334640 A1 | 11/2016 | De Juan, Jr. et al. | |
| 2016/0370603 A1 | 12/2016 | De Juan, Jr. et al. | |
| 2017/0038604 A1 | 2/2017 | De Juan, Jr. et al. | |
| 2017/0131566 A1 | 5/2017 | De Juan, Jr. et al. | |
| 2017/0315380 A1 | 11/2017 | De Juan, Jr. et al. | |
| 2017/0315381 A1 | 11/2017 | De Juan, Jr. et al. | |
| 2017/0340481 A1 | 11/2017 | Daxer | |
| 2018/0321511 A1 | 11/2018 | De Juan, Jr. et al. | |
| 2018/0344521 A1 | 12/2018 | Daxer | |
| 2019/0310493 A1 | 10/2019 | Thompson | |
| 2019/0353930 A1 | 11/2019 | De Juan, Jr. et al. | |
| 2020/0004047 A1 | 1/2020 | De Juan, Jr. et al. | |
| 2020/0166777 A1* | 5/2020 | Rafaeli ................. G02C 7/049 | |
| 2020/0264450 A1 | 8/2020 | De Juan | |
| 2021/0096397 A1 | 4/2021 | De Juan, Jr. et al. | |
| 2021/0181530 A1 | 6/2021 | Alster et al. | |
| 2022/0390763 A1 | 12/2022 | De Juan, Jr. et al. | |

FOREIGN PATENT DOCUMENTS

| | | | |
|---|---|---|---|
| CN | 1261684 | 8/2000 | |
| DE | 3143839 A1 | 5/1983 | |
| EP | 0042679 A2 | 12/1981 | |

(56) References Cited

FOREIGN PATENT DOCUMENTS

| EP | 0378512 | A2 | 7/1990 |
| EP | 0378512 | A3 | 5/1991 |
| EP | 0434205 | A2 | 6/1991 |
| EP | 0574352 | A1 | 12/1993 |
| EP | 0590772 | A1 | 4/1994 |
| EP | 0378512 | B1 | 2/1995 |
| EP | 0638416 | A1 | 2/1995 |
| EP | 0683416 | A1 | 11/1995 |
| EP | 0590772 | B1 | 4/1998 |
| EP | 0985157 | B1 | 10/2004 |
| EP | 1496388 | B1 | 4/2016 |
| FR | 2330025 | A1 | 5/1977 |
| GB | 2107895 | A | 5/1983 |
| JP | S55101125 | U | 7/1980 |
| JP | 2661909 | B2 | 10/1997 |
| JP | H11151263 | A | 6/1999 |
| JP | H11249048 | A | 9/1999 |
| JP | 2003107411 | A | 4/2003 |
| JP | 2004504105 | A | 2/2004 |
| JP | 2004510199 | A | 4/2004 |
| JP | 2007195818 | | 8/2007 |
| JP | 2009098457 | A | 5/2009 |
| JP | 5278453 | B2 | 9/2013 |
| JP | 5727456 | B2 | 6/2015 |
| JP | 5727457 | B2 | 6/2015 |
| JP | 5943931 | B2 | 7/2016 |
| WO | WO-9014083 | A1 | 11/1990 |
| WO | WO-9207617 | A1 | 5/1992 |
| WO | WO-9307840 | A1 | 4/1993 |
| WO | WO-9405225 | A1 | 3/1994 |
| WO | WO-9429756 | A2 | 12/1994 |
| WO | WO-9513764 | A1 | 5/1995 |
| WO | WO-9515134 | A1 | 6/1995 |
| WO | WO-9627816 | A1 | 9/1996 |
| WO | WO-9719381 | A1 | 5/1997 |
| WO | WO-9803267 | A1 | 1/1998 |
| WO | WO-9854603 | A1 | 12/1998 |
| WO | WO-9930560 | A1 | 6/1999 |
| WO | WO-9943354 | A2 | 9/1999 |
| WO | WO-9946631 | A1 | 9/1999 |
| WO | WO-9943354 | A3 | 11/1999 |
| WO | WO-0009042 | A1 | 2/2000 |
| WO | WO-0168082 | A1 | 9/2001 |
| WO | WO-0206883 | A2 | 1/2002 |
| WO | WO-0210841 | A1 | 2/2002 |
| WO | WO-02068008 | A1 | 9/2002 |
| WO | WO-03097759 | A1 | 11/2003 |
| WO | WO-2004068196 | A1 | 8/2004 |
| WO | WO-2004097502 | A1 | 11/2004 |
| WO | WO-2004109368 | A2 | 12/2004 |
| WO | WO-2005079290 | A2 | 9/2005 |
| WO | WO-2005116729 | A2 | 12/2005 |
| WO | WO-2006026666 | A2 | 3/2006 |
| WO | WO-2006026666 | A3 | 7/2006 |
| WO | WO-2006113149 | A2 | 10/2006 |
| WO | WO-2006121591 | A1 | 11/2006 |
| WO | WO-2006134649 | A1 | 12/2006 |
| WO | WO-2007002231 | A1 | 1/2007 |
| WO | WO-2007044513 | A1 | 4/2007 |
| WO | WO-2007053297 | A2 | 5/2007 |
| WO | WO-2007053297 | A3 | 10/2007 |
| WO | WO-2009065061 | A1 | 5/2009 |
| WO | WO-2006113149 | A3 | 6/2009 |
| WO | WO-2009073213 | A1 | 6/2009 |
| WO | WO-2009145842 | A2 | 12/2009 |
| WO | WO-2009146151 | A2 | 12/2009 |
| WO | WO-2010051172 | A1 | 5/2010 |
| WO | WO-2010144317 | A1 | 12/2010 |
| WO | WO-2011004800 | A1 | 1/2011 |
| WO | WO-2011050327 | A1 | 4/2011 |
| WO | WO-2011050365 | A1 | 4/2011 |
| WO | WO-2012061160 | A1 | 5/2012 |
| WO | WO-2012149056 | A1 | 11/2012 |
| WO | WO-2013184239 | A1 | 12/2013 |
| WO | WO-2014043221 | A1 | 3/2014 |
| WO | WO-2014210186 | A2 | 12/2014 |
| WO | WO-2015069927 | A1 | 5/2015 |
| WO | WO-2015073718 | A1 | 5/2015 |
| WO | WO-2015116559 | A1 | 8/2015 |
| WO | WO-2020049356 | A1 | 3/2020 |
| WO | WO-2020132443 | A2 | 6/2020 |
| WO | WO-2022086756 | A1 | 4/2022 |
| WO | WO-2023177652 | A1 | 9/2023 |

OTHER PUBLICATIONS

Bausch & Lomb Boston® Materials & Solutions Product Guide (38 pages) (2009).

Bissen-Miyajima et al. Role of the endothelial pump in flap adhesion laser in situ keratomileusis. J Cataract Refract Surg 30(9):1989-1992 (2004).

Bosch et al. Topographic anatomy of the eyelids, and the effects of sex and age. Br J Ophthalmol. 83(3):347-52 (1999).

Muller et al. Architecture of human corneal nerves. Invest Ophthalmol Vis Sci. 38:985-994 (1997).

PCT/US2009/002166 International Search Report and Written Opinion dated Nov. 19, 2009.

PCT/US2009/039675 International Search Report and Written Opinion dated Nov. 20, 2009.

PCT/US2010/053854 International Search Report and Written Opinion dated Mar. 1, 2011.

PCT/US2010/053975 International Search Report and Written Opinion dated Feb. 11, 2011.

PCT/US2011/057755 International Search Report dated Feb. 7, 2012.

PCT/US2012/035050 International Search Report and Written Opinion dated Oct. 3, 2012.

PCT/US2013/033567 International Search Report dated Mar. 4, 2014.

PCT/US2013/037219 International Search Report and Written Opinion dated Jul. 22, 2013.

PCT/US2013/059244 International Search Report and Written Opinion dated Nov. 18, 2013.

PCT/US2014/044136 International Search Report and Written Opinion dated Jan. 16, 2015.

PCT/US2014/064391 International Search Report and Written Opinion dated Jan. 26, 2015.

PCT/US2014/065543 International Search Report and Written Opinion dated Feb. 25, 2015.

PCT/US2015/013006 International Search Report and Written Opinion dated Apr. 2, 2015.

PCT/US2021/054533 International Search Report and Written Opinion dated Dec. 28, 2021.

PCT/US2023/015167 International Search Report and Written Opinion dated Jul. 10, 2023.

Schimmelpfenning et al. A technique for controlled sensory denervation of the rabbit cornea, Database accession No. NLM7129102. Graefe's Archive for Clinical and Experimental Opthalmology 218(6):287-293 (1987). (Abstract only).

Sorbara et al. Metrics of the normal cornea: anterior segment imaging with the Visante OCT. Clin Exp Optom 93(3):150-156 (2010).

SynergEyes® Inc. Product Overview of Clearkone® and Synergeyes® PS retrieved from the Internet http:/US7www.synergeyes.comUS7index.html on May 29, 2012 (5 pages).

SynergEyes Inc. SynergEyes® A. package insert P/N 70008 Rev. 1 (12 pages).

SynergEyes Inc. SynergEyes® A Practitioner Training retrieved from the Internet: <http://www.fitsynergeyes.com/syn_asynergeyesA_presentation.pdf> (52 pgs).

U.S. Appl. No. 12/384,659 Office Action dated Jan. 21, 2016.

U.S. Appl. No. 12/384,659 Office Action dated May 30, 2017.

U.S. Appl. No. 12/384,659 Office Action dated Nov. 4, 2016.

U.S. Appl. No. 12/897,131 Office Action dated Jan. 24, 2013.

U.S. Appl. No. 12/897,131 Office Action dated Jul. 5, 2012.

U.S. Appl. No. 12/897,131 Office Action dated Sep. 9, 2014.

U.S. Appl. No. 13/456,168 Office Action dated Sep. 12, 2013.

U.S. Appl. No. 13/503,841 Office Action dated Jun. 27, 2014.

(56) References Cited

OTHER PUBLICATIONS

U.S. Appl. No. 13/503,841 Office Action dated Jun. 9, 2016.
U.S. Appl. No. 13/503,841 Office Action dated Mar. 1, 2017.
U.S. Appl. No. 13/503,841 Office Action dated Nov. 16, 2015.
U.S. Appl. No. 13/503,841 Office Action dated Nov. 26, 2014.
U.S. Appl. No. 13/503,842 Office Action dated Apr. 3, 2014.
U.S. Appl. No. 13/503,842 Office Action dated Aug. 13, 2014.
U.S. Appl. No. 13/503,842 Office Action dated Nov. 25, 2015.
U.S. Appl. No. 13/555,056 Office Action dated Mar. 28, 2014.
U.S. Appl. No. 13/555,056 Office Action dated Sep. 5, 2014.
U.S. Appl. No. 13/865,780 Office Action dated Nov. 6, 2015.
U.S. Appl. No. 13/885,135 Office Action dated Jun. 11, 2015.
U.S. Appl. No. 13/885,135 Office Action dated Nov. 18, 2014.
U.S. Appl. No. 13/894,176 Office Action dated Aug. 5, 2013.
U.S. Appl. No. 13/928,077 Office Action dated Oct. 22, 2013.
U.S. Appl. No. 14/061,311 Office Action dated Apr. 21, 2016.
U.S. Appl. No. 14/061,311 Office Action dated Mar. 9, 2017.
U.S. Appl. No. 14/173,516 Office Action dated Apr. 3, 2019.
U.S. Appl. No. 14/173,516 Office Action dated Feb. 8, 2017.
U.S. Appl. No. 14/286,605 Office Action dated Dec. 18, 2014.
U.S. Appl. No. 14/468,075 Office Action dated Apr. 1, 2016.
U.S. Appl. No. 14/468,075 Office Action dated Nov. 5, 2015.
U.S. Appl. No. 14/468,075 Office Action dated Nov. 7, 2016.
U.S. Appl. No. 14/532,707 Office Action dated Feb. 25, 2016.
U.S. Appl. No. 14/532,732 Office Action dated Apr. 11, 2016.
U.S. Appl. No. 14/532,732 Office Action dated Oct. 3, 2016.
U.S. Appl. No. 14/539,698 Office Action dated Oct. 9, 2015.
U.S. Appl. No. 14/793,965 Office Action dated Dec. 31, 2015.
U.S. Appl. No. 14/966,918 Office Action dated Nov. 18, 2016.
U.S. Appl. No. 15/096,442 Office Action dated Dec. 28, 2016.
U.S. Appl. No. 15/184,922 Office Action dated Jun. 2, 2017.
U.S. Appl. No. 15/184,922 Office Action dated Mar. 30, 2018.
U.S. Appl. No. 15/209,511 Office Action dated Apr. 30, 2018.
U.S. Appl. No. 15/209,511 Office Action dated Aug. 5, 2019.
U.S. Appl. No. 15/209,511 Office Action dated Jan. 3, 2019.
U.S. Appl. No. 15/221,942 Office Action dated Feb. 1, 2018.
U.S. Appl. No. 15/253,183 Office Action dated Nov. 3, 2017.
U.S. Appl. No. 15/289,793 Office Action dated Jan. 22, 2019.
U.S. Appl. No. 15/652,855 Office Action dated Aug. 9, 2018.
U.S. Appl. No. 15/652,855 Office Action dated Mar. 1, 2019.
U.S. Appl. No. 15/654,344 Office Action dated Mar. 22, 2019.
U.S. Appl. No. 15/684,010 Office Action dated Aug. 12, 2019.
U.S. Appl. No. 15/695,889 Office Action dated Jun. 13, 2019.
U.S. Appl. No. 15/695,889 Office Action dated Sep. 18, 2018.
U.S. Appl. No. 15/807,985 Office Action dated Feb. 5, 2019.
U.S. Appl. No. 15/917,071 Office Action dated Sep. 7, 2018.
U.S. Appl. No. 16/559,479 Office Action dated Nov. 5, 2020.
U.S. Appl. No. 16/849,292 Office Action dated Dec. 13, 2022.
U.S. Appl. No. 16/849,292 Office Action dated Mar. 17, 2022.

* cited by examiner

ASTIGMATISM CORRECTING CONTACT LENSES

CROSS-REFERENCE

This application is a bypass CON of International Application No. PCT/US2021/054533 filed Oct. 12, 2021, claims benefit of U.S. Provisional Patent Application No. 63/093,517, filed on Oct. 19, 2020 which is incorporated herein by reference in its entirety.

BACKGROUND

Prior contact lenses and therapeutic coverings can be less than ideal in at least some instances. Many contact lenses and therapeutic coverings can be left in the eye for less than ideal durations of time, as the wearer removing and replacing the contact lens or therapeutic covering can be somewhat cumbersome. In some instances, wearers may leave the contact lens or therapeutic covering in the eye for amounts of time that can be longer than would be ideal. Although extended wear lenses can be left in the eye for a somewhat longer duration of time, the duration of time such lenses can be left in the eye can be less than ideal. Tear flow of prior contact lenses can be less than ideal, and that less than ideal tear flow may be related to the potential complications and can limit the duration of time such lenses can be left in the eye.

In light of the above, it would be desirable to provide improved contact lenses for vision correction and coverings for treatments related to various conditions of an eye of a subject, such as astigmatism. The contact lenses and coverings described here may provide treatments that may improve tear flow which may help avoid at least some of the deficiencies of known contact lenses and/or techniques while providing improved patient comfort and/or vision.

SUMMARY

The present disclosure is generally directed to vision and treatment of the eye to provide improved vision. Although specific reference is made to contact lenses for vision correction such as astigmatism-masking, embodiments of the present disclosure may comprise additional uses and applications such as the correction of refractive error of an eye, the treatment of an eye having epithelial defects, aberration correction, multifocal correction, presbyopia correction, and more. Some embodiments of the present disclosure comprise extended wear contact lenses.

The present disclosure provides coverings, such as contact lenses. The coverings may provide improved vision for extended periods of time and can be used to treat normal eyes or eyes having a defect, such as astigmatism, an epithelial defect, such as an epithelial defect subsequent to a refractive surgery such as LASIK or PRK. In some cases, the coverings (e.g., contact lenses) may mask astigmatism in an eye of a subject without surgery. Provided herein are coverings which may comprise or be one or more contact lenses suitable to be positioned on an eye of a subject.

In an aspect, the present disclosure provides an astigmatism-masking contact lens. The contact lens comprises an inner portion comprising an anterior surface. The inner portion comprises a pillar and an annular region disposed around the pillar. The contact lens further comprises a peripheral portion disposed radially outward from the inner portion. The peripheral portion has a posterior surface configured to contact a surface of an eye when disposed thereon. A posterior surface of the pillar has a curvature configured to contact a cornea of the eye when disposed thereon. A posterior surface of the annular region has a curvature which diverges from a refractive shape of the cornea such that it may vault to form a lenticular volume therebetween when disposed thereon. The pillar may be disposed in a central location of the inner portion.

In some embodiments, the contact lens may further comprise a plurality of fenestrations disposed in the inner portion, the outer portion, or both the inner portion and the outer portion. In some cases, the plurality of fenestrations may be configured to induce flow of tear fluid into and out of the lenticular volume, when the eye blinks.

In some embodiments, at least one fenestration of the plurality of fenestrations may extend from an anterior surface of the peripheral portion to the posterior surface of the peripheral portion. In some embodiments, the posterior surface of the peripheral portion may comprise one or more grooves thereon which may be configured to provide a fluid flow pathway between the at least one fenestration and the lenticular volume.

In some embodiments, at least one fenestration of the plurality of fenestrations may extend from the anterior surface of the inner portion to the posterior surface of the annular region.

In some embodiments, the inner portion may further comprise an outer region disposed between the annular region and the peripheral portion and may be configured to contact the eye when disposed thereon. In some cases, at least one fenestration of the plurality of fenestrations may extend from the anterior surface of the inner portion to a posterior surface of the outer region. In some embodiments, the posterior surface of the outer region may comprise one or more grooves thereon which may be configured to provide a fluid flow pathway between the at least one fenestration and the lenticular volume.

In some embodiments, at least one fenestration of the plurality of fenestrations may be disposed outside an optic zone of the inner portion.

In some embodiments, the inner portion may be configured to mask astigmatism independent of the orientation of contact lens about a central optical axis of the cornea.

In some embodiments, the inner portion may be configured to mask astigmatism up to about 2.5 D.

In some embodiments, the anterior surface of the inner portion may be characterized by a substantially spherical profile.

In some embodiments, the posterior surface of the annular region may be characterized by a substantially spherical profile.

In some embodiments, the inner portion and the peripheral portion may comprise a silicone hydrogel.

In some embodiments, the pillar may comprise a width of no more than about 2 mm.

In some embodiments, the pillar may comprise a width of about 1 mm.

In some embodiments, the pillar may comprise a thickness within a range of about 10 micrometers to about 30 micrometers. In some embodiments, the pillar may comprise a thickness of about 30 micrometers.

In some embodiments, the annular region may have an outer diameter of about 5 mm. In some embodiments, the lenticular volume may comprise a sag height within a range of about 5 micrometers.

In some embodiments, the annular region may be formed by molding and/or etching.

In some embodiments, a method of correcting astigmatism in an eye is provided. The method may comprise providing any of the contact lenses described herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the present disclosure are set forth with particularity in the appended claims. A better understanding of the features and advantages of the present disclosure will be obtained by reference to the following detailed description that sets forth illustrative embodiments, in which the principles of the present disclosure are utilized, and the accompanying drawings (also "Figure" and "FIG." herein), of which:

DETAILED DESCRIPTION

Figure 1:
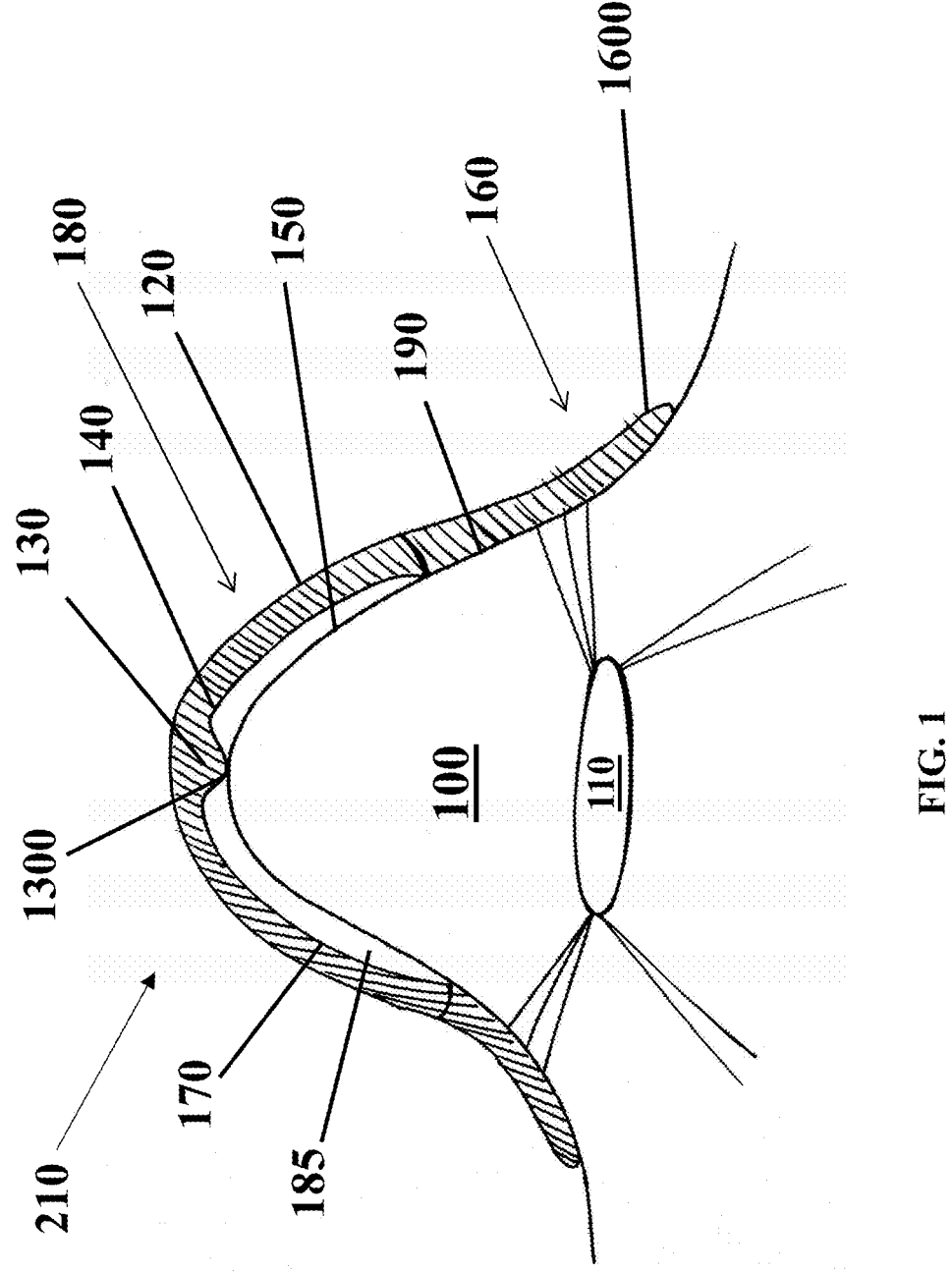
FIG. 1 shows a side sectional view of a covering on an eye of a subject, in accordance with embodiments of the present disclosure.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments, however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Unless otherwise defined, all technical terms used herein have the same meaning as commonly understood by one of ordinary skill in the art to which this disclosure belongs.

As used herein, the singular forms "a." "an." and "the" include plural references unless the context clearly indicates otherwise. Any reference to "or" herein is intended to encompass "and/or" unless otherwise stated. It will be further understood that the terms "comprises" and/or "comprising." when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under". "below". "lower". "over". "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present disclosure.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," "less than or equal to," or "at most" precedes the first numerical value in a series of two or more numerical values, the term "no more than," "less than," "less than or equal to," or "at most" applies to each of the numerical values in that series of numerical values. For example, less than or equal to 3, 2, or 1 is equivalent to less than or equal to 3, less than or equal to 2, or less than or equal to 1.

Where values are described as ranges, it will be understood that such disclosure includes the disclosure of all possible sub-ranges within such ranges, as well as specific numerical values that fall within such ranges irrespective of whether a specific numerical value or specific sub-range is expressly stated.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Many of the features of the present disclosure are described in relation to the anatomy of the eye of a subject. The eye includes several tissues that allow a subject to see. The subject may be an animal. The subject may be a human, such as a patient. The cornea of the eye is an anterior region of the eye that is clear in healthy eyes and refracts light to form an image on the retina. The retina is a posterior region of the eye that senses light from the image formed thereon and transmits signals from the image to the brain. The cornea includes an outer layer of tissue, the epithelium, which protects the underlying tissues of the cornea, such as Bowman's membrane, the stroma and nerve fibers that extend into the stroma and Bowman's membrane. A healthy eye includes a tear film disposed over the epithelium. The tear film can smooth small irregularities of the epithelium to provide an optically-smooth surface. The tear film is shaped substantially by the shape of the underlying epithelium, stroma, and Bowman's membrane, if present. The tear film comprises a liquid that is mostly water but also includes additional components, such as mucoids and lipids. The many nerve fibers of the cornea provide sensation to promote blinking that can cover the cornea with the tear film. The never fibers also sense pain so that a subject will normally avoid trauma to the cornea and also avoid direct contact of an object to the cornea.

The embodiments described herein can be used to treat eye in many ways using one or more coverings. The coverings may comprise contact lenses. The coverings and/ or contact lenses may be capable of masking astigmatism and may be used to treat the same. Such contact lenses may comprise one or more astigmatism-masking contact lenses. The contact lenses may come in various versions. The coverings may comprise one or more soft lenses which may fit normally. In some cases, the contact lenses may be used for long-term vision correction with extended wear. The contact lenses may be used to treat astigmatism. In other examples, the coverings and/or contact lenses may be used in combination with or after surgery for improved results and/or recovery.

In some examples, the contact lenses may mask astigmatism by at least about 20%, 30%, 40%, 50%, 60%, 65%, 70%, 75%, 80%, 85%, 90%, 95%, 99%, or more. In some cases, the contact lenses may mask astigmatism by at most about 99%, 95%, 90%, 85%, 80%, 75%, 70%, 65%, 60%, 50%, 40%, 30%, 20%, or less. For example, a covering may mask astigmatism up to 2D. The contact lenses may mask astigmatism by an amount that is within a range defined by any two of the preceding values.

In some cases, the contact lenses may reduce stock keeping unit (SKU) requirements by at least about 50%, 60%, 70%, 80%, 90%, 95%, 99%, or more compared to soft toric contact lenses or other conventional contact lenses. In some cases, the contact lenses may reduce SKU requirements by at most about 99%, 95%, 90%, 80%, 70%, 60%, 50%, or less compared to soft toric contact lenses or other conventional contact lenses. For example, a covering provided herein may reduce SKUs requirements for up to about 95%. The contact lenses may reduce SKU requirements by an amount that is within a range defined by any two of the preceding values.

Figure 2A:
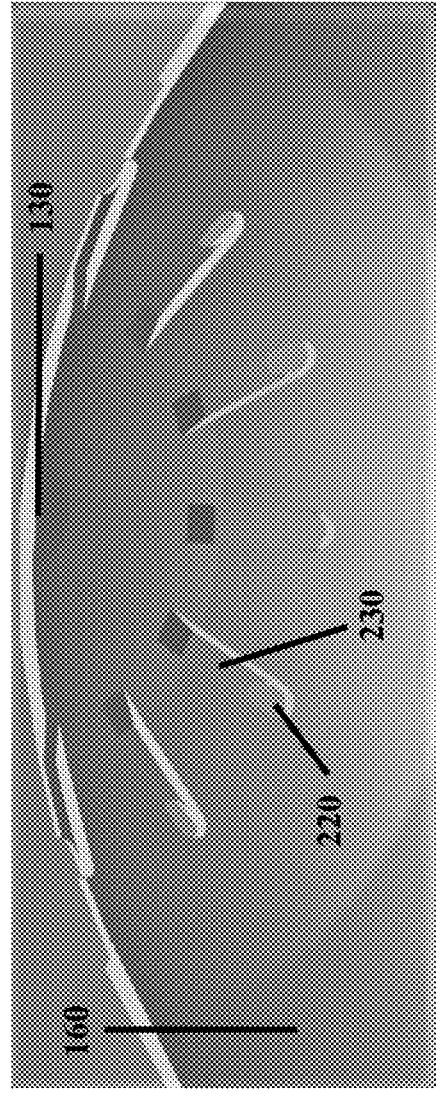
FIGS. 2A and 2B show perspective views of a covering, in accordance with embodiments of the present disclosure.
Figure 2B:
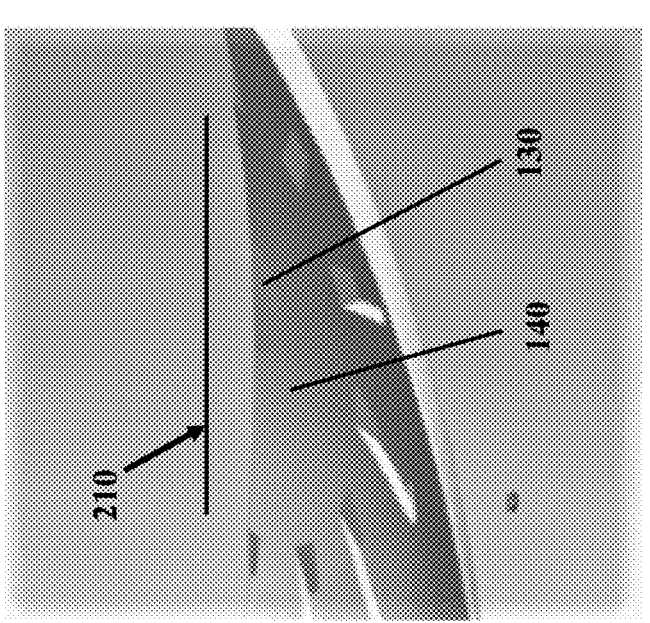
Figure 3:
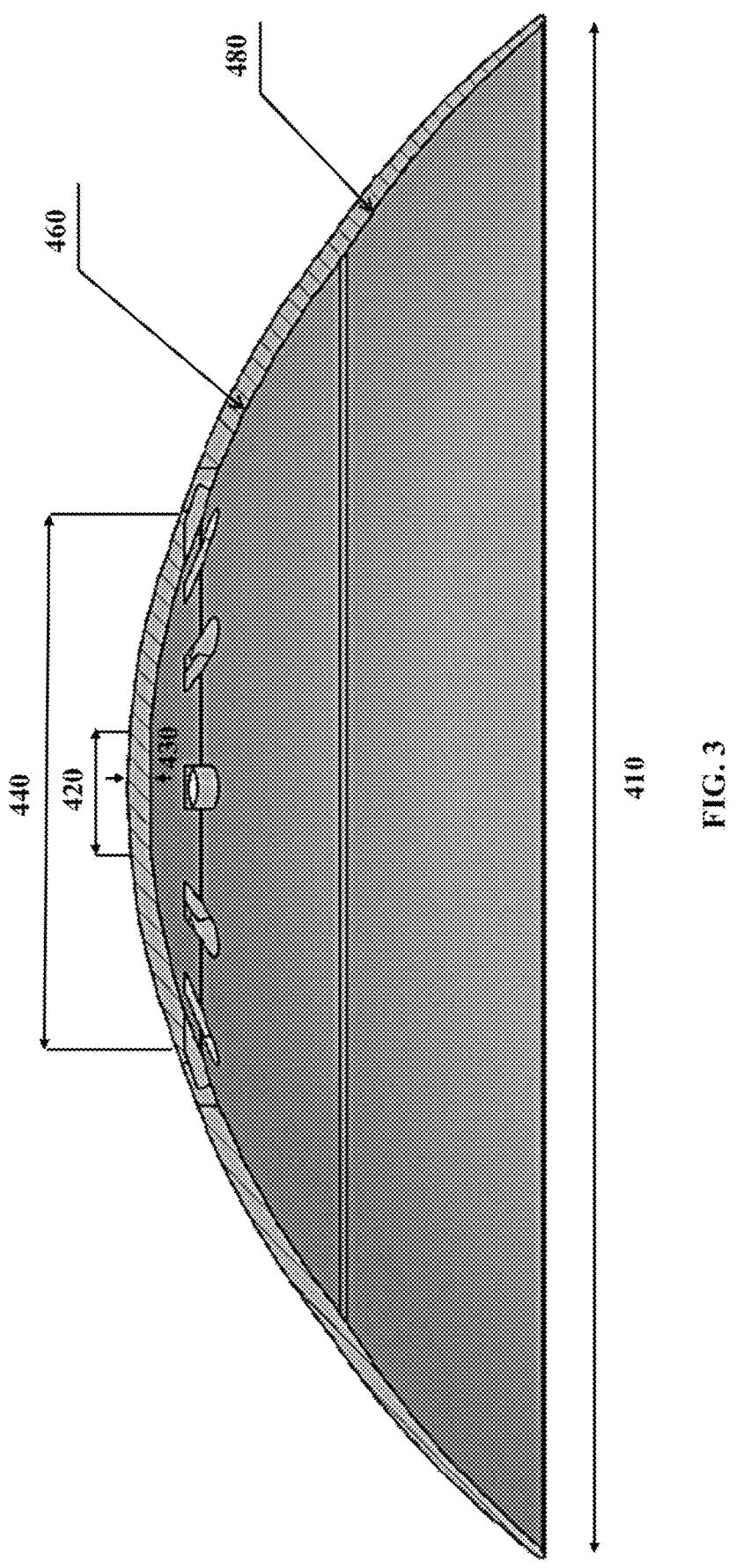
FIG. 3 shows the dimensions of a covering in a side sectional view, in accordance with embodiments of the present disclosure.

Provided herein are coverings which may be used to correct an astigmatism in an eye of a subject. A side sectional view of an exemplary covering 120 positioned or disposed on an eye 100 of a subject is schematically illustrated in FIG. 1. Three-dimensional (3D) views of a covering 120 are shown in FIGS. 2A and 2B. A three-dimensional (3D) side sectional view of the covering 120 providing its dimensions is shown in FIG. 3.

FIG. 1 shows a side sectional view of a covering 120 positioned or disposed on an eye 100 of a subject. The covering 120 may comprise or be a contact lens. The eye 100 comprises a cornea 150 and an eye lens 110 configured to form an image on the retina (not shown). The covering 120 may, for example, be configured to correct or mask an astigmatism of the eye 100. The covering 120 may comprise an inner portion 210, which may comprise an anterior surface 170. The inner portion 210 may comprise a pillar 130 and an annular region 180 disposed around the pillar 130. The pillar 130 may be disposed in a central location of the inner portion 210 (e.g., the pillar may be a central pillar). Alternatively, the pillar 130 may not be at the center of the inner portion 210. For example, the pillar 130 may be offset. The pillar 130 may be located anywhere in the inner portion 210 of the covering 120. The covering 120 may further comprise a peripheral portion 160 disposed radially outward from the inner portion 210. The peripheral portion 160 may have a posterior surface 190 configured to contact a surface of the eye 100 when disposed thereon. A posterior surface 1300 of the pillar 130 may have a curvature configured to contact a cornea 150 of the eye 100 when disposed thereon. A posterior surface 140 of the annular region 180 may have a curvature which may diverge from a refractive shape of the cornea 150 such that it may vault to form a lenticular volume 185 therebetween when disposed thereon. The lenticular volume 185 may be formed within the annular region 180. In some embodiments, the entire annular region 180 may form the lenticular volume 185 when disposed upon the eye 100. The annular region 180 may comprise the lenticular volume 185, which may act as a chamber (e.g., an annular chamber). The chamber may be configured to store a liquid, such as tears, which may keep the eye 100 or a surface thereof moist and prevent the eye from dehydration. This may add to the comfort of the covering while it is in use. The lenticular volume 185 may also be referred to as a tear lens. In some embodiments, the lenticular volume 185 may provide an optical power to the subject when placed on the eye 100. In some embodiments, the lenticular volume may not provide an optical power when placed on the eye 100.

FIGS. 2A and 2B show perspective views of a covering 120. The covering 120 may be substantially similar to any of the coverings descried herein. The covering 120 may comprise a plurality of fenestrations 220. The plurality of fenestrations 220 may be configured to induce flow of tear fluid into and out of the annular region 180 (e.g., into the lenticular volume 185), for example when the eye 100 blinks. This may create a tear film on the covering 120 (e.g., lens) and/or on the eye 100 which may make the subject more comfortable while wearing the covering 120. In some cases, at least one fenestration 220 of the plurality of fenestrations may extend from an anterior surface 190 of the peripheral portion 160 to the posterior surface 1600 of the peripheral portion 160. The covering 120 may comprise an optical zone. The optical zone may comprise or be the inner portion 210. The fenestration 220 may be located away from the inner portion 210 (e.g., the optical zone and/or optical component therein).

A fenestration 220 may be at least about 3 millimeters (mm), 3.1 mm, 3.2 mm, 3.3 mm, 3.4 mm, 3.5 mm, 3.6 mm, 3.6 mm, 3.7 mm, 3.8 mm, 3.9 mm, 4 mm, 4.1 mm, 4.2 mm, 4.3 mm, 4.4 mm, 4.5 mm, 4.6 mm, 4.7 mm, 4.8 mm, 4.9 mm, 5 mm or more, away from the center of the optical component, such as the center of the optic zone of the covering. In some examples, the fenestration 220 may be at most about 5 mm, 4.9 mm, 4.8 mm, 4.7 mm, 4.6 mm, 4.5 mm, 4.4 mm, 4.3 mm, 4.2 mm, 4.1 mm, 4 mm, 3.9 mm, 3.8 mm 3.7 mm, 3.6 mm, 3.5 mm, 3.4 mm, 3.3 mm, 3.2 mm, 3.1 mm, 3 mm, or less, away from the center of the inner portion 210 or center of the optic zone of the covering. The fenestrations 220 may be located a distance away from the center of the inner portion 210 (e.g., the center of the optical zone of the covering) that may be within a range defined by any two of the preceding values. For instance, the fenestration 220 may be located from about 2 mm to about 5 mm away from the center of the inner portion 210 of the covering 120 which may comprise or be the optical zone of the covering. In an example, the fenestration 220 is about 3.5 mm away from the center of the inner portion. In the example shown in FIG. 1, the center of the inner portion 210 is co-located with the pillar 130: however, the pillar 130 can be anywhere in the inner portion 210. Therefore, in the example, shown in FIG. 1, a fenestration 220 of the plurality of fenestrations may be from about 2 mm to 5 mm away from the center of the pillar 130 (central pillar in this example). For example, the fenestrations 220 may be about 3.5 mm away from the center of the pillar 130.

Locating the fenestrations 220 away from the inner portion 210 (e.g., optic zone) may help to decrease potential optical artifacts which, in some cases may be caused by the fenestrations 220. In other examples, the fenestrations 220 may be inside the inner portion 210 (e.g., optical zone). In some examples, the fenestrations 220 may be partially inside and/or partially outside the inner portion 210 (e.g., optic zone). For example, when the fenestrations (e.g., fenestrations 220 or other fenestrations) are sufficiently small in diameter and sufficiently few so as to not produce perceptible visual artifacts, the fenestrations may be closer to the optical zone (e.g., the inner portion 210), partially inside, and/or wholly inside the optical zone.

In some examples, a characteristic dimension (such as a length, width, or diameter) of the fenestrations (e.g., fenestrations 220) may be at least about 0.1 mm, 0.2 mm, 0.3 mm, 0.4 mm, 0.5 mm, 0.6 mm, 0.7 mm, 0.8 mm, 0.9 mm, 1 mm, or more. In some examples, a characteristic dimension of the fenestrations may be at most about 1 mm, 0.9 mm, 0.8 mm, 0.7 mm, 0.6 mm, 0.5 mm, 0.4 mm, 0.3 mm, 0.2 mm, 0.1 mm, or less. A characteristic dimension of the fenestrations may be within a range defined by any two of the preceding values. For instance, a characteristic dimension of the fenestrations may be within a range from about 0.1 mm to about 1 mm, from about 0.2 mm to about 0.5 mm, or from about 0.3 mm to about 0.4 mm. In an example, the diameter of the fenestration is about 0.4 mm.

In some cases, the posterior surface 1600 of the peripheral portion 160 may comprise one or more grooves 230 thereon which may be configured to provide a fluid flow pathway between the at least one fenestration 220 and the annular region 180 (e.g., lenticular volume). In some cases, a posterior surface of the covering 120 (e.g., the posterior surface 1600 of the peripheral portion 160 of the covering 120) may comprise a plurality of grooves 230. For instance, the covering 120 (e.g., the posterior surface 1600) may comprise at least about 1, 2, 3, 4, 5, 6, 7, 8, 9, 10, 20, 30, 40, 50, 60, 70, 80, 90, 100, 200, 300, 400, 500, 600, 700, 800, 900, 1,000, or more grooves. The posterior surface (e.g., posterior surface 1600) may comprise at most about 1,000, 900, 800, 700, 600, 500, 400, 300, 200, 100, 90, 80, 70, 60, 50, 40, 30, 20, 10, 9, 8, 7, 6, 5, 4, 3, 2, or 1 groove(s). The posterior surface may comprise a number of grooves that is within a range defined by any two of the preceding values. For instance, the posterior surface may comprise between 1 to about 1000 grooves.

In some cases, at least one fenestration of the plurality of fenestrations 220 may extend from the anterior surface 170 of the inner portion 210 to the posterior surface 140 of the annular region 180. The inner portion 210 may further comprise an outer region disposed between the annular region and the peripheral portion and may be configured to contact the eye when disposed thereon. In some cases, at least one fenestration 220 of the plurality of fenestrations may extend from the anterior surface 170 of the inner portion to a posterior surface of the outer region.

The dimensions of an example covering are shown in FIG. 3. The pillar (e.g., pillar 130 in FIGS. 1, 2A, 2B, and 3) of the covering 120 may comprise a pillar width 420. The pillar width 420 may be less than about 2 mm. In some examples, the pillar width 420 may be at most about 2.5 mm, 2.4 mm, 2.3 mm, 2.2 mm, 2.1 mm, 2.0 mm, 1.9 mm, 1.8 mm, 1.7 mm, 1.6 mm, 1.5 mm, 1.4 mm, 1.3 mm, 1.2 mm, 1.1 mm, 1 mm, 0.9 mm, 0.8 mm, 0.7 mm, 0.6 mm, 0.5 mm, or less. In some examples, the width of the pillar may be at least about 0.5 mm, 0.6 mm, 0.7 mm, 0.8 mm, 0.9 mm, 1 mm, 1.1 mm, 1.2 mm, 1.3 mm, 1.4 mm, 1.5 mm, 1.6 mm, 1.7 mm, 1.8 mm, 1.9 mm, 2 mm, 2.1 mm, 2.2 mm, 2.3 mm, 2.4 mm, 2.5 mm, or more. The pillar width 420 may be within a range defined by any two of the preceding values. In some cases, the pillar width 420 may be about 1 mm. In some examples, the pillar width 420 may be at least about 0.1 mm, 0.2 mm, 0.3 mm, 0.38 mm, 0.4 mm, 0.5 mm, 0.53 mm, 0.55 mm, 0.56 mm, 0.6 mm, 0.65 mm, 0.68 mm, 0.7 mm, 0.8 mm, 0.9 mm, 1 mm, or more. The pillar may comprise a width 420 that is within a range defined by any two of the preceding values. For instance, the pillar may comprise a width from about 0.3 to about 0.7.

The pillar may comprise a thickness 430 within a range of about 10 micrometers (μm) to about 30 μm. In some examples, the thickness of the pillar may be at least about 5 μm, 6 μm, 7 μm, 8 μm, 9 μm, 10 μm, 11 μm, 12 μm, 13 μm, 14 μm, 15 μm, 16 μm, 17 μm, 18 μm, 19 μm, 20 μm, 21 μm, 22 μm, 23 μm, 24 μm, 25 μm, 26 μm, 27 μm, 28 μm, 29 μm, 30 μm, 31 μm, 32 μm, 33 μm, 34 μm, 35 μm, 36 μm, 37 μm, 38 μm, 39 μm, 40 μm, or more. In some examples, the thickness of the pillar may be at most about 40 μm, 39 μm, 38 μm, 37 μm, 36 μm, 35 μm, 34 μm, 33 μm, 32 μm, 31 μm, 30 μm, 29 μm, 28 μm, 27 μm, 26 μm, 25 μm, 24 μm, 23 μm, 22 μm, 21 μm, 20 μm, 19 μm, 18 μm, 17 μm, 16 μm, 15 μm, 14 μm, 13 μm, 12 μm, 11 μm, 10 μm, 9 μm, 8 μm, 7 μm, 6 μm, 5 μm, or less. The pillar may comprise a thickness that is within a range defined by any two of the preceding values. For example, the pillar may comprise a thickness of about 30 μm.

The annular region 180 (shown in FIG. 1) may have an outer diameter 440 of about 5 millimeters (mm). In some examples, the annular region may comprise an outer diameter 440 of at least about 2.5 mm, 2.75 mm, 3 mm, 3.25 mm, 3.5 mm, 3.75 mm, 4 mm, 4.1 mm, 4.2 mm, 4.3 mm, 4.4 mm, 4.5 mm, 4.6 mm, 4.7 mm, 4.8 mm, 4.9 mm, 5 mm, 5.1 mm, 5.2 mm, 5.3 mm, 5.4 mm, 5.5 mm, 5.6 mm, 5.7 mm, 5.8 mm, 5.9 mm, 6.0 mm, 6.1 mm, 6.2 mm, 6.3 mm, 6.4 mm, 6.5 mm, 6.6 mm, 6.7 mm, 6.8 mm, 6.9 mm, 7 mm, or more. In some examples, the annular region may comprise an outer diameter 240 of at most about 7 mm, 6.9 mm, 6.8 mm, 6.7 mm, 6.6 mm, 6.5 mm, 6.4 mm, 6.3 mm, 6.2 mm, 6.1 mm, 6 mm, 5.9 mm, 5.8 mm, 5.7 mm, 5.6 mm, 5.5 mm, 5.4 mm, 5.3 mm, 5.2 mm, 5.1 mm, 5 mm, 4.9 mm, 4.8 mm, 4.7 mm, 4.6 mm, 4.5 mm, 4.4 mm, 4.3 mm, 4.2 mm, 4.1 mm, 4 mm, 3.75 mm, 3.5 mm, 3.25 mm, 3 mm, 2.75 mm, 2.5 mm, or less. The annular region may comprise an outer diameter 440 that is within a range defined by any two of the preceding values.

The annular region (e.g., lenticular volume) may comprise a sag height. In some examples, the sag height may be within a range of about 5 micrometers of the sag height of the cornea. The sag height of the lenticular volume may be at least about 3 μm, 3.25 μm, 3.5 μm, 3.75 μm, 4 μm, 4.25 μm, 4.5 μm, 4.6 μm, 4.7 μm, 4.8 μm, 4.9 μm, 5 μm, 5.1 μm, 5.2 μm, 5.3 μm, 5.4 μm, 5.5 μm, 5.6 μm, 5.7 μm, 5.8 μm, 5.9 μm, 6 μm, 6.1 μm, 6.2 μm, 6.3 μm, 6.4 μm, 6.5 μm, 7 μm, 7.5 μm, 8 μm, 8.5 μm, 9 μm, or more from the sag height of the cornea. In some examples, the sag height 470 of the lenticular volume may be at most about 9 μm, 8.5 μm, 8 μm, 7.5 μm, 7 μm, 6.5 μm, 6.4 μm, 6.3 μm, 6.2 μm, 6.1 μm, 6 μm, 5.9 μm, 5.8 μm, 5.7 μm, 5.6 μm. 5.5 μm, 5.4 μm, 5.3 μm, 5.2 μm, 5.1 μm, 5 μm, 4.9 μm, 4.8 μm, 4.7 μm, 4.6 μm, 4.5 μm, 4.25 μm, 4 μm, 3.75 μm, 3.5 μm, 3.25 μm, 3 μm, or less from the sag height of the cornea. The sag height of the lenticular volume may be within a range defined by any two of the preceding values from the sag height of the cornea.

The covering 120 (e.g., shown in FIG. 1) may comprise a covering diameter 410. In an example, the covering diameter 410 may be about 14.5 mm. In some examples, the diameter 410 of the covering may be at least about 12 mm, 12.5 mm, 13 mm, 13.1 mm, 13.2 mm, 13.3 mm, 13.4 mm, 13.5 mm, 13.6 mm, 13.7 mm, 13.8 mm, 13.9 mm, 14 mm, 14.1 mm, 14.2 mm, 14.3 mm, 14.4 mm, 14.5 mm, 14.6 mm, 14.7 mm, 14.8 mm, 14.9 mm, 15 mm, 15.1 mm, 15.2 mm, 15.3 mm, 15.4 mm, 15.5 mm, 15.6 mm, 15.7 mm, 15.8 mm, 15.9 mm, 16 mm, 16.1 mm, 16.2 mm, 16.3 mm, 16.4 mm, 16.5 mm, 16.6 mm, 16.7 mm, 16.8 mm, 16.9 mm, 17 mm, or more. In some examples, the covering may comprise a diameter 210 of at most about 17 mm, 16.9 mm, 16.8 mm, 16.7 mm, 16.6 mm, 16.5 mm, 16.4 mm, 16.3 mm, 16.2 mm, 16.1 mm, 16 mm, 15.6 mm, 15.5 mm, 15.4 mm, 15.3 mm, 15.2 mm, 15.1 mm, 15 mm, 14.9 mm, 14.8 mm, 14.7 mm, 14.6 mm, 14.5 mm, 14.4 mm, 14.3 mm, 14.2 mm, 14.1 mm, 14 mm, 13.9 mm, 13.8 mm, 13.7 mm, 13.6 mm, 13.5 mm, 13.4 mm, 13.3 mm, 13.2 mm, 13.1 mm, 13 mm, 12.5 mm, 12 mm, or less. The covering may comprise a diameter 210 that is within a range defined by any two of the preceding values.

The covering 120 may comprise a base radius (R1) 460 corresponding to a curvature of a inner portion of the cornea (base curvature). The covering may further comprise a second radius (R2) 480 corresponding to the peripheral portion of the covering/lens (peripheral curvature). The base radius (R1) 460 may be at least about 4 millimeters (mm), 4.5 mm, 4.6 mm, 4.7 mm, 4.8 mm, 4.9 mm, 5 mm, 5.1 mm, 5.2 mm, 5.3 mm, 5.4 mm, 5.5 mm, 5.6 mm, 5.7 mm, 5.8 mm, 5.9 mm, 6 mm, 6.1 mm, 6.2 mm, 6.3 mm, 6.4 mm, 6.5 mm, 6.6 mm, 6.7 mm, 6.8 mm, 6.9 mm, 7 mm, 7.1 mm, 7.2 mm, 7.3 mm, 7.4 mm, 7.5 mm, 7.6 mm, 7.7 mm, 7.8 mm, 7.86 mm, 7.9 mm, 8 mm, 8.1 mm, 8.2 mm, 8.3 mm, 8.4 mm, 8.5 mm, 8.6 mm, 8.7 mm, 8.8 mm, 8.9 mm, 9 mm, or more. In some examples, the base radius may be at most about 9 mm, 8.9 mm, 8.8 mm, 8.7 mm, 8.6 mm, 8.5 mm, 8.4 mm, 8.3 mm, 8.2 mm, 8.1 mm, 8 mm, 7.9 mm, 7.8 mm, 7.7 mm, 7.6 mm, 7.5 mm, 7.4 mm, 7.3 mm, 7.2 mm, 7.1 mm, 7 mm, 6.9 mm, 6.8 mm, 6.7 mm, 6.6 mm, 6.5 mm, 6.4 mm, 6.3 mm, 6.2 mm, 6.1 mm, 6 mm, 5.9 mm, 5.8 mm, 5.7 mm, 5.6 mm, 5.5 mm, 5.4 mm, 5.3 mm, 5.2 mm, 5.1 mm, 5 mm, 4.9 mm, 4.8 mm, 4.7 mm, 4.6 mm, 4.5 mm, 4 mm, or less. The base radius (R1) may be within a range defined by any two of the preceding values. In some examples, the base radius (R1) 460 may be within a range between about 4.5 mm to 8.8 mm.

The second radius (R2) 480 may have a curvature of at least about 6 millimeters (mm), 6.1 mm, 6.2 mm, 6.3 mm, 6.4 mm, 6.5 mm, 6.6 mm, 6.7 mm, 6.8 mm, 6.9 mm, 7 mm, 7.1 mm, 7.2 mm, 7.3 mm, 7.4 mm, 7.5 mm, 7.6 mm, 7.7 mm, 7.8 mm, 7.9 mm, 8 mm, 8.1 mm, 8.2 mm, 8.3 mm, 8.4 mm, 8.5 mm, 8.6 mm, 8.7 mm, 8.8 mm, 8.9 mm, 9 mm, 9.1 mm, 9.2 mm, 9.3 mm, 9.4 mm, 9.5 mm, 9.6 mm, 9.7 mm, 9.8 mm, 9.9 mm, 10 mm, 10.1 mm, 10.2 mm, 10.3 mm, 10.4 mm, 10.5 mm, 10.6 mm, 10.7 mm, 10.8 mm, 10.9 mm, 11 mm, 11.1 mm, 11.2 mm, 11.3 mm, 11.4 mm, 11.5 mm, 11.6 mm, 11.7 mm, 11.8 mm, 11.9 mm, 12 mm, 12.5 mm, 13 mm, 14 mm, 14.5 mm, 15 mm or more. The second radius (R2) 480 may have a curvature of at most about 15 mm, 14.5 mm, 14 mm, 13 mm, 12.5 mm, 12 mm, 11.9 mm, 11.8 mm, 11.7 mm, 11.6 mm, 11.5 mm, 11.4 mm, 11.3 mm, 11.2 mm, 11.1 mm, 11 mm, 10.9 mm, 10.8 mm, 10.7 mm, 10.6 mm, 10.5 mm, 10.4 mm, 10.3 mm, 10.2 mm, 10.1 mm, 10 mm, 9.9 mm, 9.8 mm, 9.7 mm, 9.6 mm, 9.5 mm, 9.4 mm, 9.3 mm, 9.2 mm, 9.1 mm, 9 mm, 8.9 mm, 8.8 mm, 8.7 mm, 8.6 mm, 8.5 mm, 8.4 mm, 8.3 mm, 8.2 mm, 8.1 mm, 8 mm, 7.9 mm, 7.8 mm, 7.7 mm, 7.6 mm, 7.5 mm, 7.4 mm, 7.3 mm, 7.2 mm, 7.1 mm, 7 mm, 6.9 mm, 6.8 mm, 6.7 mm, 6.6 mm, 6.5 mm, 6.4 mm, 6.3 mm, 6.2 mm, 6.1 mm, 6 mm, or less. The second radius (R2) 480 may have a curvature that is within a range defined by any two of the preceding values. As an example, the peripheral curvature may comprise a radius (R2) 480 of about 9.324 mm. In some examples, the peripheral curve may comprise a radius (R2) 480 within a range from about 6.5 mm to about 14.5 mm.

Provided herein are methods for making the covering. The annular region 180 of the covering 120 may be formed by molding and/or etching. In some examples, the annular region may be formed by methods other than molding or etching as will be understood by one of ordinary skill in the art based on the teachings herein. The anterior surface of the inner portion may be characterized by a substantially spherical profile. For example, the substantially spherical profile may be molded or etched. The posterior surface 140 of the annular region 180 may be characterized by a substantially spherical profile.

The covering may comprise a polymeric material. For example, the inner portion 210 and the peripheral portion 160 may comprise a hydrogel (e.g., a silicone hydrogel). The inner portion 210 and the peripheral portion 160 (e.g., the anterior surface 190 of the peripheral portion 160) may comprise a polymeric material. In some cases, the peripheral portion 160, in part or in whole may be made of a polymeric material. The inner portion and the peripheral portion may comprise a soft material. The material used in the inner portion and the peripheral portion may be biocompatible, inert, non-toxic, and/or non-invasive to the eye of the subject. The material may facilitate fitting the covering on the eye. The soft material may make the covering comfortable on the eye of the subject. In some cases, the pillar may comprise a polymeric material. The material used in the pillar may be solid. Alternatively, the material used in the pillar may be a gel. In some cases, the material used in the pillar may make the pillar harder compared to its surroundings. A harder pillar may confer a structure to the covering.

The covering may comprise one or more of many optically clear materials, such as synthetic materials or natural materials. The covering may comprise collagen-based materials. Such collagen-based materials, and combinations thereof, are described in U.S. patent application Ser. No. 12/384,659, filed Apr. 6, 2009, entitled "Therapeutic Device for Pain Management and Vision. U.S. Pub. No. US 2010-0036488 A1, published on 11 Feb. 2010, which is herein incorporated by reference in its entirety for all purposes. Alternatively, or in combination, the covering may comprise a known synthetic material, such as hydroxyethyl methacrylate (HEMA) hydrogel, hydrogel, silicone, hydrated silicone, and derivatives thereof. For example, the optically clear material may comprise one or more of silicone, silicone hydrogel, silicone comprising resin, silicone comprising silicate, acrylate, and collagen. A silicone may comprise a cured silicone that is two-part heat cured and room-temperature vulcanized. For example, polydimethyl siloxane (such as NuSil, or poly(dimethyl)(diphenyl)siloxane) may be used to mold the covering, for example with less than 10% water content so as to increase oxygen diffusion through the covering. The covering 120 may comprise perfluoropolyethers or fluorofocal. The covering may comprise an elastic material such as silicone. The material may allow the covering to seal the cornea.

The lens material can be cured with a hardness and size and shape such that the covering comprises a modulus. The modulus may be at least about 1 megapascals (MPa), 2 MPa, 3 MPa, 4 MPa, 5 MPa, 6 MPa, 7 MPa, 8 MPa, 9 MPa, 10 MPa, 15 MPa, 20 MPa, 25 MPa, 30 MPa, 35 MPa, 40 MPa, or more. The modulus may be at most about 40 MPa, 35 MPa, 30 MPa, 25 MPa, 20 MPa, 15 MPa, 10 MPa, 9 MPa, 8 MPa, 7 MPa, 6 MPa, 5 MPa, 4 MPa, 3 MPa, 2 MPa, 1 MPa, or less. The modulus may be within a range defined by any two of the preceding values. For instance, the modulus may be from about 4 MPa to about 40 MPa. The material may comprise, for example, silicone elastomer having optically clear silicate disposed therein. In some cases, the material may have a water content of at most about 20%, 15%, 10%, 9% 8%, 7%, 6%, 5%, 4%, 3%, 2%, 1%, or less. The material may have a water content of at least about 1%, 2%, 3%, 4%, 5%, 6%, 7%, 8%, 9%, 10%, 15%, 20%, or more. The material may have a water content that is within a range defined by any two of the preceding values. An example material may contain at most about 5% water content. In some cases, the lens covering may have a high oxygen permeability (Dk), which in some cases may exceed 150. The silicone lens comprising silicate can be treated to provide a wettable surface. The lens may comprise a hydrogel, for example silicone hydrogel. In some examples, the water content of the lens material may be at least about 1%, 2%, 3%, 4%, 5%, 6%, 7%, 8%, 9%, 10%, 11%, 12%, 13%, 14% 15%, 20%, 25%, 30%, 35%, 40%, 50%, or more. In some examples, the water content of the lens material may be at most about 50%, 40%, 35%, 30%, 25%, 20%, 15%, 14%, 13%, 12%, 11%, 10%, 9%, 8%, 7%, 6% 5%, 4%, 3%, 2%, 1%, or less. The water content of the lens material may be within a range defined by any two of the preceding values. For instance, the covering/lens material may comprise a water content within a range from about 5% to about 35%.

In some cases, the covering/lens material may comprise a modulus within a range from about 4 to about 40 MPa, such that the covering conforms at least partially to the ablated stroma. In some examples, the covering/lens material may have a modulus of at least about 1 MPa, 2 MPa, 3 MPa, 4 MPa, 5 MPa, 6 MPa, 7 MPa, 8 MPa, 9 MPa, 10 MPa, 15 MPa, 20 MPa, 25 MPa, 30 MPa, 35 MPa, 40 MPa, 45 MPa, 50 MPa, or more. In some examples, the covering/lens material may have a modulus of at most about 50 MPa, 45

MPa, 40 MPa, 35 MPa, 30 MPa, 25 MPa, 20 MPa, 15 MPa, 10 MPa, 9 MPa, 8 MPa, 7 MPa, 6 MPa, 5 MPa, 4 MPa, 3 MPa, 2 MPa, 1 MPa, or less. The covering/lens material may have a modulus that is within a range defined by any two of the preceding values.

The covering may comprise silicone or silicone hydrogel having a low ionoporosity such that covering seals to the cornea. For example, covering may comprise silicone hydrogel comprising a low ion permeability, and the range of water can be from about 5% to about 35%, such that the Dk is 100 or more. The low ion permeability may comprise an Ionoton Ion Permeability Coefficient of at most about $0.25\times 10^{-3}$ cm$^2$/sec so as to seal the cornea. For example, the Ionoton Ion Permeability Coefficient may be at most about $0.08\times10^{-3}$ cm$^2$/sec. The low ion permeability may comprise an Ionoton Ion Permeability Coefficient of at most about $2.6\times10^{-6}$ mm$^2$/min to seal the cornea. For example, the Ionoton Ion Permeability Coefficient may be at most about $1.5\times10^{-6}$ mm$^2$/min.

The covering may comprise a wettable surface coating disposed on at least the upper side of the covering, such that the tear film of the patient is smooth over the covering and the patient can see. The wettable surface coating may comprise a lubricious coating for patient comfort. For example, the lubricious coating may lubricate the eye when the patient blinks. The wettable coating may comprise a contact angle of at most about 85 degrees, 80 degrees, 75 degrees, 70 degrees, 65 degrees, 60 degrees, 55 degrees, 50 degrees, or less. The wettable coating may comprise a contact angle of at least about 50 degrees, 55 degrees, 60 degrees, 65 degrees, 70 degrees, 75 degrees, 80 degrees, 85 degrees, or more. The wettable coating may comprise a contact angle that is within a range defined by any two of the preceding values. For example, the contact angle can be within a range from about 55 to 65 degrees to provide a surface with a smooth tear layer for vision. For example, the wettable coating can be disposed on both an upper surface and a lower surface of the covering. The upper surface may comprise the wettable coating extending over at least the inner portion.

Figure 4:
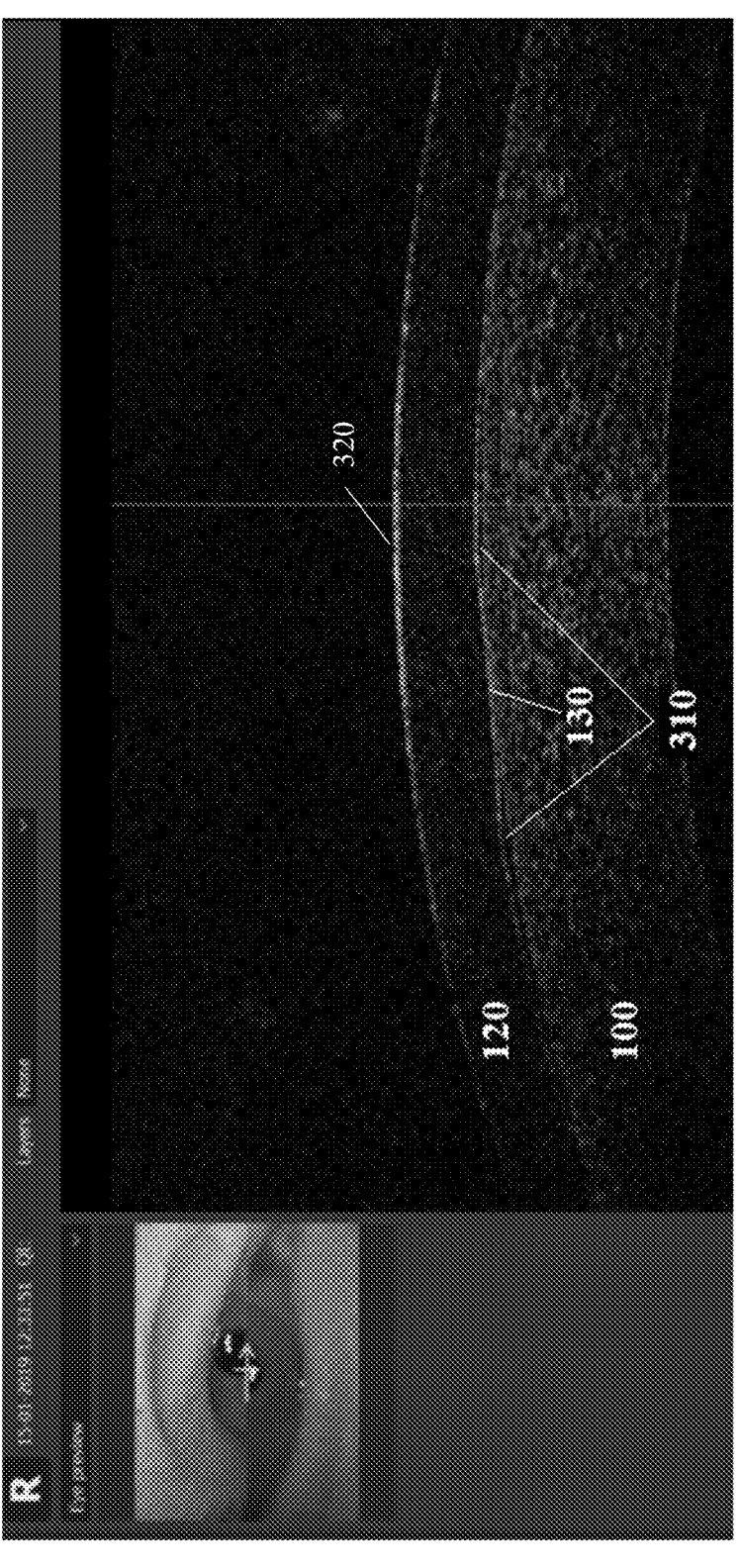
FIG. 4 shows an anterior segment optical coherence tomography (OCT) image of a covering on an eye of a subject, in accordance with embodiments of the present disclosure.

Provided herein is a method of correcting astigmatism in an eye. The method may comprise providing any one of the coverings or contact lenses described herein. The inner portion 210 of the covering 120 may comprise or be the optical zone of the covering and may be configured to mask astigmatism. In some cases, the inner portion may mask astigmatism independent of the orientation of contact lens about a central optical axis of the cornea 150. In some embodiments, the pillar 130 of the covering may be aligned with the central optical axis of the cornea 150. In other cases, such as illustrated in FIG. 4, the pillar of the covering may not be aligned with the central optical axis of the cornea 320. The inner portion of the covering may be configured to mask astigmatism in either case.

In some examples, the covering (e.g., the optic zone of the covering or the contact lens) may be configured to mask an astigmatism of an eye of a subject. In some cases, the inner portion 210 of the covering 120 may be configured to mask astigmatism up to about 2.5 diopters (D). In some cases, the inner portion 210 of the covering 120 may be configured to mask astigmatism up to about 5 D, 4.75 D, 4.5 D, 4.25 D, 4 D, 3.75 D, 3.5 D, 3.25 D, 3 D, 2.75 D, 2.5 D, 2.25 D, 2.0 D, 1.75 D, 1.5 D, 1 D, 0.7 D, 0.5 D, or less. In some cases, the inner portion 210 of the covering 120 may be configured to mask astigmatism up to about 0.5 D, 0.7 D, 1 D, 1.5 D, 1.75 D, 2.0 D, 2.25 D, 2.5 D, 2.75 D, 3 D, 3.25 D, 3.5 D, 3.75 D, 4 D, 4.25 D, 4.5 D, 4.75D, 5 D, or more.

EXAMPLES

Example 1

An exemplary covering (e.g., an example of a covering schematically shown in FIG. 3) was made with an outer diameter (e.g., outer diameter 410) of about 14.5 mm. Referring to FIG. 3, the exemplary covering may comprise a base radius (R1) 460 within a range between 4.5 mm to 8.5 mm (e.g., R1=7.86 mm) and a second radius (R2) 480 of about 9.324. The exemplary covering may further comprise one or more fenestrations, such as fenestration 220 shown in FIG. 2B. The fenestration (e.g., fenestration 220) may comprise a size of about 0.4 mm. The outer diameter of the annular region (e.g., diameter 440 shown in FIG. 3) may be about 5 mm. The covering may comprise a groove (e.g., groove 230 with a length of about 0.12 mm, and an EBC of about 8.9 mm with a definitive 65 material.

Example 2

Three exemplary coverings were generated using the method described in Example 1. Characteristic dimensions of the three example coverings (06A501, 06A502, 06A503) are provided in Table 1.

TABLE 1

| Lens type | Sag height 470 (mm) | Pillar thickness (mm) | Outer diameter of inner portion 440 (mm) | Distance of fenestration from the center of the inner portion (mm) |
|---|---|---|---|---|
| 06A501 | 0.05 | 10 | 7.25 | 3.5 |
| 06A502 | 0.05 | 20 | 7.25 | 3.5 |
| 06A503 | 0.05 | 30 | 7.25 | 3.5 |

Example 3

FIG. 4 shows an anterior segment optical coherence tomography (OCT) of an exemplary covering 120 disposed on an eye 100 of a subject. The exemplary covering used in FIG. 3 is covering 06A502 provided in Table 1. The inner portion of the covering 120 comprises a pillar 130. In some examples, the pillar 130 may be a central pillar. For example, the pillar may be approximately at the center of the covering, such as at the center of the inner portion 210 or optical zone of the covering 120. FIG. 3 shows two vaultings 310 that form an annular region (e.g., an annular chamber), similar to annular region 180 shown in FIGS. 1, 2A, and 2B. The annular region 180 or 310 (e.g., lenticular volume) may be located between the posterior surface of the annular region 180 of the covering 120 and the cornea 150 of the eye 100.

Example 4

Figure 5:
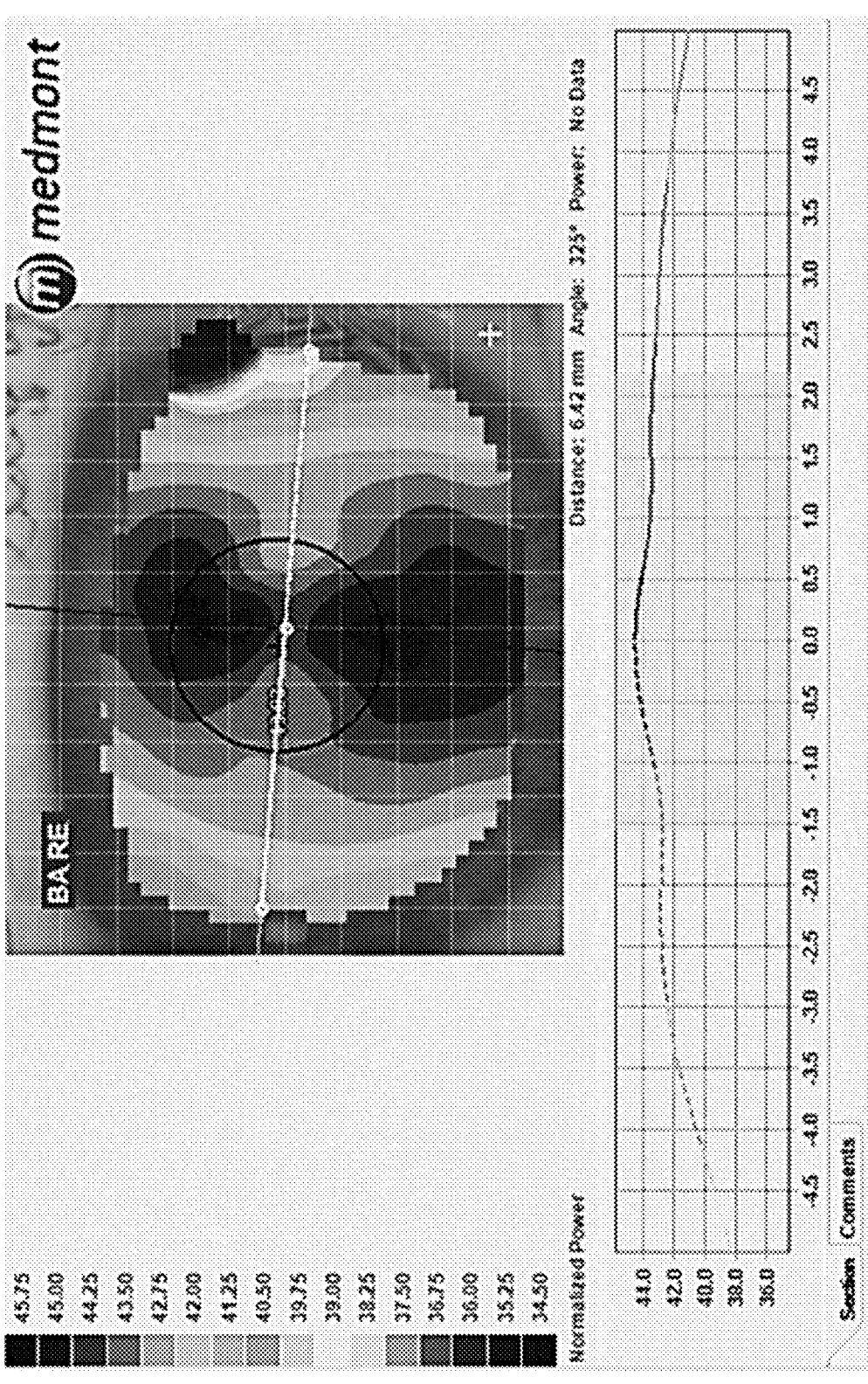
FIG. 5 shows a baseline topography of an eye of a subject with non-corrected astigmatism, in accordance with embodiments of the present disclosure.
Figure 6:
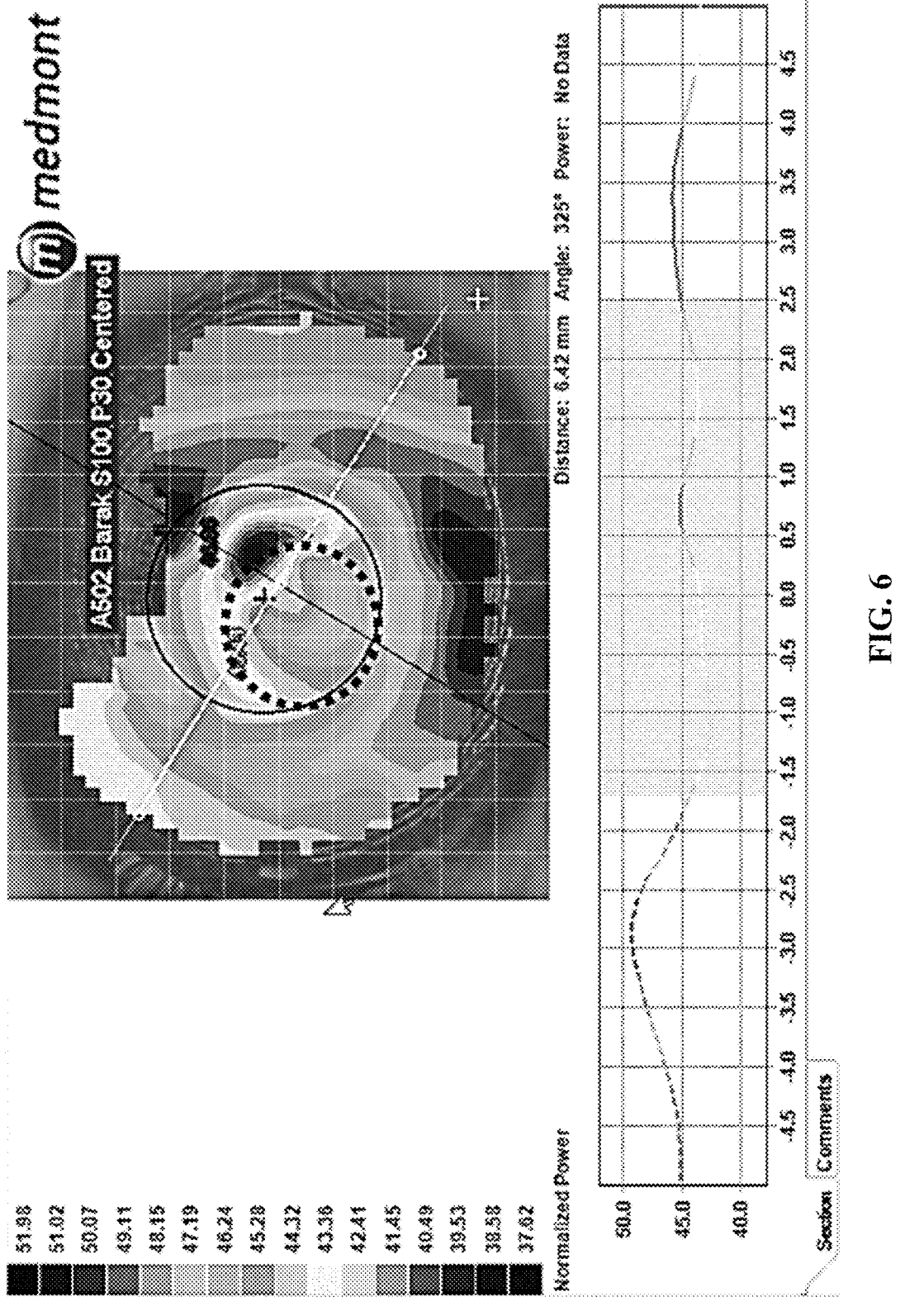
FIG. 6 shows a topography of an eye of a subject wearing an eye covering, in accordance with embodiments of the present disclosure.

The covering 06A502 was disposed on an eye of a subject to correct astigmatism. The eye of the subject was suspected of having an astigmatism. A baseline medmont topography of the eye of the subject was measured, the picture of which is provided in FIG. 5. It was determined that the eye of the subject had an astigmatism of about 2.5 D. Measurements obtained from this analysis are provided in the second column of Table 2. The covering 06A502 was then disposed on the eye while the subject was sitting up. In this example, the lens was decentered temporally and down. The topography image of the eye of the subject with covering 06A502 disposed thereon is provided in FIG. 6. The flatter area of the eye is circled with a dashed line. Measurements obtained from this analysis are provided in the third column of Table 2.

TABLE 2

| | Baseline Medmont topography of eye with 2.5D astigmatism | Medmont Topography of eye corrected with lens (A502) |
|---|---|---|
| Flat K | 43.03 D @ 175° | 43.03 D @ 149° |
| Strep K | 45.51 D @ 85° | 45.51 D @ 59° |
| ΔK | 2.48 D | 3.43 D |
| Flat $e^2$ | 0.53 @ 175° | −0.07 @ 149° |
| Steep $e^2$ | 0.01 @ 85° | 0.79 @ 59° |
| IS Index | 0.81 D | 1.58 D |
| SAI | 0.53 | 3.87 |
| SRI | 1.12 | 2.3 |
| Pupil: Width | 3.8 mm | 4.2 mm |
| Pupil: Area | 11.4 mm$^2$ | 14.3 mm$^2$ |
| TFSQ | 0.082 | 0.806 |
| TFSQ Central | 0.072 | 0.616 |

Retinoscopy was used to determine that the covering 06A502 provided the subject with a spherical refraction of −2.25 D, nearly completely masking the astigmatism of the eye. A supine position was used to overcome the decentralization which occurred when the patient was sitting up.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. An astigmatism-masking contact lens, the contact lens comprising:

an inner portion comprising an anterior surface, wherein the inner portion comprises a pillar and an annular region disposed around the pillar; and a peripheral portion disposed radially outward from the inner portion and having a posterior surface configured to contact a surface of an eye when disposed thereon;

wherein a portion of a posterior surface of the pillar is configured to contact a cornea of the eye when disposed thereon, wherein a posterior surface of the annular region has a curvature which diverges from a refractive shape of the cornea such that the posterior surface of the annular region vaults to form a lenticular volume therebetween when disposed thereon.

2. The contact lens of claim 1, wherein the pillar is disposed in a central location of the inner portion.

3. The contact lens of claim 1, wherein the posterior surface of the pillar has a curvature that is configured to contact a cornea of the eye when disposed thereon.

4. The contact lens of claim 3, wherein at least one fenestration of the plurality of fenestrations is disposed outside an optic zone of the inner portion.

5. The contact lens of claim 1, further comprising a plurality of fenestrations disposed in the inner portion, the outer portion, or both the inner portion and the outer portion.

6. The contact lens of claim 5, wherein the plurality of fenestrations is configured to induce flow of tear fluid into and out of the lenticular volume when the eye blinks.

7. The contact lens of claim 5, wherein at least one fenestration of the plurality of fenestrations extends from an anterior surface of the peripheral portion to the posterior surface of the peripheral portion.

8. The contact lens of claim 7, wherein the posterior surface of the peripheral portion comprises one or more grooves configured to provide a fluid flow pathway between the at least one fenestration and the lenticular volume.

9. The contact lens of claim 5, wherein at least one fenestration of the plurality of fenestrations extends from the anterior surface of the inner portion to the posterior surface of the annular region.

10. The contact lens of claim 5, wherein the inner portion further comprises an outer region disposed between the annular region and the peripheral portion and configured to contact the eye when disposed thereon.

11. The contact lens of claim 10, wherein at least one fenestration of the plurality of fenestrations extends from the anterior surface of the inner portion to a posterior surface of the outer region.

12. The contact lens of claim 11, wherein the posterior surface of the outer region comprises one or more grooves thereon configured to provide a fluid flow pathway between the at least one fenestration and the lenticular volume.

13. The contact lens of claim 1, wherein the inner portion is configured to mask astigmatism independent of the orientation of contact lens about a central optical axis of the cornea.

14. The contact lens of claim 1, wherein the pillar has a width of no more than about 2 mm.

15. The contact lens of claim 14, wherein the pillar has a width of 0.5 mm or less.

16. The contact lens of claim 1, wherein the pillar has a thickness within a range of about 5 micrometers to about 30 micrometers.

17. The contact lens of claim 1, wherein the pillar has a thickness of 5 micrometers or less.

18. The contact lens of claim 1, wherein the annular region has an outer diameter of about 2.5 mm to about 7 mm.

19. The contact lens of claim 1, wherein the lenticular volume has a sagittal height of about 3 micrometers to about 9 micrometers.

20. The contact lens of claim 1, wherein the annular region is formed by molding or etching.

* * * * *